(12) United States Patent
Kim et al.

(10) Patent No.: US 12,315,915 B2
(45) Date of Patent: May 27, 2025

(54) NI BASED CATHODE MATERIAL FOR RECHARGEABLE LITHIUM-ION BATTERIES

(71) Applicants: Umicore, Brussels (BE); Umicore Korea Ltd., Chungnam (KR)

(72) Inventors: Jihye Kim, Cheonan (KR); Jens Paulsen, Cheonan (KR); Areum Park, Cheonan (KR); Dae-Hyun Kim, Cheonan (KR); Hee-Sung Gil, Cheonan (KR)

(73) Assignees: UMICORE, Brussels (BE); UMICORE KOREA LTD., Cheonan (KR)

( * ) Notice: Subject to any disclaimer, the term of this patent is extended or adjusted under 35 U.S.C. 154(b) by 0 days.

(21) Appl. No.: 16/223,513

(22) Filed: Dec. 18, 2018

(65) Prior Publication Data
US 2019/0123347 A1    Apr. 25, 2019

Related U.S. Application Data

(63) Continuation-in-part of application No. 16/018,898, filed on Jun. 26, 2018, now abandoned.

(30) Foreign Application Priority Data

Jul. 14, 2017 (EP) .................... 17181335

(51) Int. Cl.
H01M 4/36 (2006.01)
C01G 53/50 (2025.01)
(Continued)

(52) U.S. Cl.
CPC ............ *H01M 4/366* (2013.01); *C01G 53/50* (2013.01); *H01M 4/131* (2013.01); *H01M 4/485* (2013.01);
(Continued)

(58) Field of Classification Search
CPC combination set(s) only.
See application file for complete search history.

(56) References Cited

U.S. PATENT DOCUMENTS 7,648,693 B2    1/2010 Paulsen et al.
2011/0003200 A1*  1/2011 Shizuka ............ H01M 10/0568
                                                  429/231.95
(Continued)

FOREIGN PATENT DOCUMENTS

WO  WO-2016055911 A1 * 4/2016 ........... C01G 53/006
WO  WO-2016116862 A1 * 7/2016 ............. C01D 15/04
WO     2017042654 A1    3/2017

OTHER PUBLICATIONS

EPO, European Search Report for European Patent Application No. 17181335, dated Dec. 19, 2017, 1 page.
(Continued)

*Primary Examiner* — Ula C Ruddock
*Assistant Examiner* — Sarika Gupta
(74) *Attorney, Agent, or Firm* — NK Patent Law

(57) ABSTRACT

The invention provides a positive electrode material for lithium ion batteries, comprising a lithium transition metal-based oxide powder having a general formula $Li_{1+a}((Ni_z(Ni_{0.5}Mn_{0.5})_y Co_x)_{1-k}A_k)_{1-a}O_2$, wherein A is a dopant, with $-0.025 \leq a \leq 0.025$, $0.15 \leq x \leq 0.22$, $0.42 \leq z \leq 0.52$, $1.075 < z/y < 1.300$, $x+y+z=1$ and $k \leq 0.01$. Different embodiments provide the following features:

the lithium transition metal-based oxide powder has a carbon content $\leq 1000$ ppm or even $\leq 400$ ppm;
the lithium transition metal-based oxide powder has a sulfur content between 0.05 and 1.0 wt %;
a dopant A is Zr, and the powder further comprises up to 1 wt % of a coating comprising a boron compound and $WO_3$.

10 Claims, 9 Drawing Sheets

(51) Int. Cl.

| | |
|---|---|
| *H01M 4/02* | (2006.01) |
| *H01M 4/131* | (2010.01) |
| *H01M 4/485* | (2010.01) |
| *H01M 4/505* | (2010.01) |
| *H01M 4/525* | (2010.01) |
| *H01M 4/58* | (2010.01) |
| *H01M 10/0525* | (2010.01) |

(52) U.S. Cl.
CPC .......... *H01M 4/505* (2013.01); *H01M 4/525* (2013.01); *H01M 4/5825* (2013.01); *H01M 10/0525* (2013.01); *C01P 2002/52* (2013.01); *C01P 2002/54* (2013.01); *C01P 2002/60* (2013.01); *C01P 2002/72* (2013.01); *C01P 2002/85* (2013.01); *C01P 2002/88* (2013.01); *C01P 2004/03* (2013.01); *C01P 2006/40* (2013.01); *C01P 2006/80* (2013.01); *H01M 2004/028* (2013.01)

(56) References Cited

U.S. PATENT DOCUMENTS

| | | | |
|---|---|---|---|
| 2011/0281168 A1* | 11/2011 | Watanabe | C01G 53/42 429/223 |
| 2012/0319037 A1 | 12/2012 | Kawahashi et al. | |
| 2013/0175469 A1* | 7/2013 | Paulsen | H01M 4/525 252/182.1 |
| 2013/0187082 A1 | 7/2013 | Choi et al. | |
| 2014/0054495 A1 | 2/2014 | Paulsen et al. | |
| 2014/0170494 A1* | 6/2014 | Paulsen | C01B 33/32 429/223 |
| 2014/0175329 A1 | 6/2014 | De Palma et al. | |
| 2015/0010824 A1 | 1/2015 | Sun et al. | |
| 2016/0013472 A1* | 1/2016 | Mitsumoto | H01M 4/485 429/231.1 |
| 2016/0211517 A1* | 7/2016 | Beck | H01M 4/505 |
| 2018/0351174 A1* | 12/2018 | Paulsen | C01G 53/50 |
| 2019/0067677 A1* | 2/2019 | Nagata | H01M 10/0525 |

OTHER PUBLICATIONS

USPTO; Non-Final Office Action for U.S. Appl. No. 16/018,898 dated Nov. 20, 2019, 22 pages.
USPTO; Non-Final Office Action for U.S. Appl. No. 16/018,898 dated Sep. 9, 2020, 21 pages.
USPTO; Final Office Action for U.S. Appl. No. 16/018,898 dated May 11, 2020, 11 pages.
USPTO; Non-Final Office Action for U.S. Appl. No. 16/018,898 dated Apr. 8, 2021, 13 pages.
USPTO; Final Office Action for U.S. Appl. No. 16/018,898 dated Aug. 2, 2021, 17 pages.
USPTO; Non-Final Office Action for U.S. Appl. No. 16/018,898 dated Nov. 9, 2021, 11 pages.
USPTO; Non-Final Office Action for U.S. Appl. No. 16/018,898 dated Mar. 15, 2022, 13 pages.
USPTO; Non-Final Office Action for U.S. Appl. No. 16/018,898 dated Jul. 7, 2022, 12 pages.
USPTO; Final Office Action for U.S. Appl. No. 16/223,513 dated Jul. 25, 2023, 17 pages.
USPTO; Non-Final Office Action for U.S. Appl. No. 18/189,289 dated Jan. 18, 2024, 24 pages.
USPTO; Final Office Action for U.S. Appl. No. 18/189,289 dated Jun. 28, 2024, 22 pages.
USPTO: Non-final Office Action in U.S. Appl. No. 18/189,289, mailed Nov. 18, 2024, 23 pages.

* cited by examiner

NI BASED CATHODE MATERIAL FOR RECHARGEABLE LITHIUM-ION BATTERIES

CROSS-REFERENCE TO RELATED APPLICATIONS

This application is a continuation-in-part of U.S. patent application Ser. No. 16/018,898, filed on Jun. 26, 2018, which claims the benefit of European Patent Application No. 17181335.5, filed on Jul. 14, 2017, the contents of each of which is incorporated by reference herein.

TECHNICAL FIELD AND BACKGROUND

This invention relates to a high Ni-excess "NMC" cathode material having a particular composition. By "NMC" we refer to lithium nickel manganese cobalt oxide. The high Ni-excess NMC powder can be preferably used as a cathode active material in rechargeable lithium-ion batteries. Batteries containing the cathode material of the invention show excellent performance, such as high reversible capacity, improved thermal stability during high temperature storage, and good long-term cycle stability when cycled at a high charge voltage.

Lithium-ion battery technology is currently the most promising energy storage means for both electro-mobility and stationary power stations. $LiCoO_2$ (doped or not—hereafter referred to as "LCO"), which previously was the most commonly used as a cathode material, has a good performance but is expensive. In addition, since cobalt resources are gradually depleted, lithium nickel cobalt aluminum oxide or lithium nickel manganese cobalt oxide (hereafter referred to as "NCA" and "NMC" respectively—note that both can be doped) have become prospective candidates of replacing LCO. These materials have a high reversible capacity, a relatively high volumetric energy density, good rate capability, long-term cycle stability, and low cost.

NMC cathode materials can (approximatively) be understood as a solid state solution of $LiCoO_2$, $LiNi_{0.5}Mn_{0.5}O_2$ and $LiNiO_2$, corresponding to the general formula $Li_{1+a}[Ni_z(Ni_{0.5}Mn0.5)_yCo_x]_{1-a}O_2$, where "z" stands for the so-called Ni-excess, as is defined below, as Ni is 100% divalent ($Ni^{2+}$) in $LiNi_{0.5}Mn_{0.5}O_2$ and Ni is 100% trivalent ($Ni^{3+}$) in $LiNiO_2$. At 4.3 V the nominal capacity of $LiCoO_2$ and $LiNi_{0.5}Mn_{0.5}O_2$ is about 160 mAh/g, against 220 mAh/g for that of $LiNiO_2$. Typical NMC based materials are expressed as $LiM'O_2$, where $M'=Ni_xMn_yCo_z$, and can be referred to as "111" material with $M'=Ni_{1/3}Mn_{1/3}Co_{1/3}$, "442" with $M'=Ni_{0.4}Mn_{0.4}Co_{0.2}$, "532" with $M'=Ni_{0.5}Mn_{0.3}Co_{0.2}$, or "622" with $M'=Ni_{0.6}Mn_{0.2}Co_{0.2}$. M' can be doped with dopants "A" such as Al, Ca, Ti, Mg, W, Zr, B, and Si, resulting in the formula $Li_{1-a}((Ni_z(Ni_{0.5}Mn_{0.5})_yCo_x)_{1-k}A_k)_{1+a}O_2$.

The reversible capacity of (undoped) NMC cathode materials can be roughly estimated from these capacities. For example, NMC 622 is comprehended as $0.2\ LiCoO_2 + 0.4\ LiNi_{0.5}Mn_{0.5}O_2 + 0.4\ LiNiO_2$. The expected capacity equals $0.2 \times 160 + 0.4 \times 160 + 0.4 \times 220 = 184$ mAh/g. The capacity increases with "Ni-excess". For example, the Ni-excess is 0.4 in NMC 622. If we assume lithium stoichiometry with Li/(Ni+Mn+Co)=1.0, then "Ni-excess" is the fraction of 3-valent Ni. FIG. 1 shows the expected capacities as a function of Ni-excess. Here, the x-axis is the Ni-excess ("z") and the y-axis is the calculated reversible capacity.

Additionally, the price of Ni and Mn is much lower than that of Co. Therefore, the cost of the cathode per unit of delivered energy is greatly reduced by using Ni and Mn instead of Co. According to '2020 cathode materials cost competition for large scale applications and promising LFP best-in-class performer in term of price per kWh' announced at the OREBA 1.0 conference on May 27, 2014, the metal price per cathode capacity of LCO is 35 S/kWh, while for NMC 111 it is 22 S/kWh. As the Ni content of NMC increases, the metal price per cathode capacity also increases because the Ni price is higher than the Mn price, but it does not reach the cost of LCO. Therefore, Ni-excess NMC with higher energy density and lower process cost—by contrast to LCO—is more preferred in today's battery market.

Large-scale manufacturing of NMC demands that it is easy to prepare and produce high-quality cathode materials. As the Ni-excess in the cathode materials is increased—which is desired from a capacity point of view—the production becomes more difficult. As an example—very high Ni-excess cathode materials like NCA—$LiNi_{0.8}Co_{0.15}Al_{0.05}O_2$ cannot be prepared in air or using $Li_2CO_3$ as a lithium source. If $Li_2CO_3$ is used as a lithium precursor, the carbonate needs to decompose and $CO_2$ is released into the gas phase. However, the $CO_2$ equilibrium partial pressures of very high Ni-excess cathode materials are very small. Thus, the gas phase transport of $CO_2$ limits the reaction kinetics and the $CO_3$ decomposition occurs very slowly—even in pure oxygen. Furthermore, very high Ni-excess cathodes have low thermodynamic stability. A fully reacted and fully lithiated very high Ni-excess cathode will even decompose when heated in normal air. The $CO_2$ partial pressure of air is high enough so that the $CO_2$ extracts lithium from the crystal structure and forms $Li_2CO_3$. Therefore $CO_2$ free gas, typically oxygen, is required during the production of very high Ni-excess cathodes. This causes higher production cost. Additionally, as the use of $Li_2CO_3$ is not possible as the lithium source, lithium precursors like $Li_2O$, $LiOH.H_2O$ or $LiOH$ need to be applied instead of the cheaper $Li_2CO_3$, which increases production cost further. In addition, the transition metal precursors—for example mixed transition metal hydroxide—need to be free of carbonate.

Finally, when using lithium hydroxide ($LiOH.H_2O$ or LiOH), the low melting point of lithium hydroxide is a point of concern. Whereas $Li_2CO_3$ tends to react before melting, lithium hydroxide tends to melt before reacting. This causes many unwanted effects during a mass production process, like inhomogeneity of products, impregnation of the ceramic saggers with molten LiOH, and etc. In addition, during the manufacturing of high Ni-excess NMC, Ni ions tend to migrate into the Li site which severely limits the actual capacity, so it is difficult to have an appropriate stoichiometry. This problem also affects the reversibility of the intercalation mechanism, leading to capacity fading. It can be summarized that the increased capacity of the very high Ni-excess cathode materials like NCA comes at a significant production cost.

Another issue of very high Ni-excess cathodes is the content of soluble base. The concept of "soluble base" is explicitly discussed in e.g. WO2012-107313: the soluble base refers to surface impurities like $Li_2CO_3$ and LiOH. Because of the low thermodynamic stability of Li in Ni-excess cathode materials, remaining carbonate decomposes very slowly or $CO_2$ being present in the air is easily adsorbed and forms $Li_2CO_3$ on the surface of cathodes. Additionally, in the presence of water or moisture, Li is easily extracted from the bulk, resulting in formation of LiOH. Thus, undesired "soluble bases" occur easily on the surface of very high Ni-excess cathodes like NCA.

In the case of very high Ni-excess, there are many possible sources of carbonate impurity. Specifically, the soluble bases can originate from the mixed transition metal hydroxides that are used as the transition metal source in the production. The mixed transition metal hydroxide is usually obtained by co-precipitation of transition metal sulfates and an industrial grade base such as sodium hydroxide (NaOH). Thus, the hydroxide can contain a $CO_3^{2-}$ impurity. During sintering with the lithium source, the residual $CO_3^{2-}$ reacts with lithium and creates $Li_2CO_3$. As $LiM'O_2$ crystallites grow during sintering, the $Li_2CO_3$ base will be accumulated on the surface of these crystallites. Thus, after sintering at high temperature in a high Ni-excess NMC, like NMC 622, carbonate compounds remain on the surface of the final product. This base can dissolve in water, and therefore the soluble base content can be measured by a technique called pH titration, as discussed in U.S. Pat. No. 7,648,693.

Soluble bases, in particular residual $Li_2CO_3$, are a major concern since they are the cause of poor cycle stability in lithium ion batteries. Also, it is not clear if very high Ni-excess is sustainable during large-scale preparation, because materials used as precursors are air sensitive. Therefore, the preparation of very high Ni-excess cathode materials is performed in $CO_2$ free oxidizing gas (typically $O_2$) to reduce the soluble base content at increasing temperature. $LiOH.H_2O$ is also used as the lithium source instead of $Li_2CO_3$ to reduce the soluble base content. A typical process to prepare high Ni-excess NMC using $LiOH.H_2O$ is for example applied in US2015/0010824. $LiOH.H_2O$ with a low $Li_2CO_3$ impurity as the lithium source is blended with the mixed transition metal hydroxide at the target composition, and sintered at high temperature under an air atmosphere. In this process, the base content of high Ni-excess NMC final product (like NMC 622) is much reduced.

There are two major trends to achieve a high energy density with Ni-excess in NMC. One trend is to increase the Ni-excess up to very high values in order to achieve high capacities at normal change voltage. The second trend is to increase the charge voltage in order to achieve high capacities with less Ni-excess. NCA, for example, has a very high Ni-excess of around 0.8 as all Ni is 3-valent. In NC91 ($LiNi_{0.9}Co_{0.1}O_2$), the Ni-excess is even 0.9. These cathode materials have very high capacities even at relatively low charge voltage. As an example—NC91 has a capacity as high as 220 mAh/g at 4.3V in a coin cell testing with lithium as a counter electrode. As discussed before, it is difficult to produce such cathode materials in a mass production process at reasonable cost. Additionally, we observe the issue of poor safety. The safety issue of charged batteries is a general concern. The safety is related to a process called thermal runaway. Due to exothermic reaction, the battery heats up and the reaction rate inside the battery increases, causing the battery to explode by thermal runaway. The thermal runaway is mostly caused by electrolyte combustion. If the battery is fully charged and the cathodes are in the delithiated state, the values of "x" in the resulting $Li_{1-x}M'O_2$ are high. These highly delithiated cathodes are very unsafe when in contact with electrolyte. The delithiated cathode is an oxidizer and can react with the electrolyte which acts as the reducing agent. This reaction is very exothermic and causes thermal runaway. In the ultimate case, the battery will explode. In a simple way, it can be explained that the electrolyte is combusted using the oxygen which is available from the delithiated cathode. Once a certain temperature in the battery has been reached the cathodes decompose and deliver oxygen which combusts the electrolyte. After the reaction—as Ni is stable in the divalent state and there is large Ni-excess—most of the transition metal is 2 valent. Schematically—each mol of cathode can deliver one mol oxygen to combust the electrolyte: $NiO_2$+ electrolyte→NiO+combustion products ($H_2O$, $CO_2$).

The other trend to achieve a high energy density is to set the Ni-excess at more intermediate values but to apply a high charge voltage. Typical values for the Ni-excess range from about 0.4 to about 0.6. This region we will be referred as "high Ni-excess". The reversible capacity at 4.2 or 4.3V of high Ni-excess NMC is less than that of "very high" Ni-excess compound (with Ni-excess >0.6). To achieve the same state of charge (i.e. remaining Li in the delithiated cathode) like very high Ni-excess cathode (fx. NCA), a battery with high Ni-excess cathode (fx. NMC622) needs to be charged to a higher voltage. A similar state of charge could, for example, be obtained at 4.2V for NCA and 4.35V using NMC622. Thus, to improve the capacity of "high Ni-excess" NMC, higher charge voltages are applied.

Even at the high charge voltage, the resulting delithiated high Ni-excess cathodes are safer than the delithiated very high Ni-excess cathodes mentioned above at lower voltage. Whereas Ni based cathodes tend to form NiO during the oxygen combustion reaction, Ni—M' tends to form more stable $M'_3O_4$ compounds during the delithiation process. These compounds have a higher final oxygen stoichiometry thus less oxygen is available to combust the electrolyte. A schematic example for a cathode without Ni-excess is $LiMn_{0.5}Ni_{0.5}O_2$→$Mn_{0.5}Ni_{0.5}O_2$+electrolyte→0.5 $NiMnO_3$+ combustion products ($H_2O$, $CO_2$). In this case, 0.5 oxygen is available to combust the electrolyte as only 50% of the transition metal is divalent after the combustion reaction. This is different from the case of very high Ni-excess cathodes discussed above, where almost 1 mol is available.

In principle, the $2^{nd}$ trend could be extended towards still less Ni-excess cathodes. Cathode materials with only a small Ni-excess could be charged to still higher voltages. As an example, NMC532 could be charged to about 4.45V or NMC442 to about 4.55V to achieve a similar capacity. In this case—due to the lower content of Ni the safety of the delithiated cathodes is expected to improve further and also the production process is simplified. However, this approach is not feasible as current electrolytes are not working well at these very high charge voltages, and thus, a poor cycle stability is observed.

The current invention refers to the $2^{nd}$ trend, applying higher charge voltages to cathode materials not having very high (>0.6) but only high Ni-excess (0.4-0.6). As both the Ni content and the charge voltage increase, it is difficult to obtain good safety and a cheap preparation process. From the prior art it is thus known that high Ni excess materials have many issues for a successful preparation and application in Li ion batteries. Therefore, to make high Ni excess materials acceptable, it is necessary to provide such cathode materials having optimized NMC compositions and enhanced battery performances, where a high reversible capacity is achieved together with good cycle stability and safety.

SUMMARY

Viewed from a first aspect, the invention can provide a positive electrode material for lithium ion batteries, comprising a lithium transition metal-based oxide powder having a general formula $Li_{1+a}((Ni_z(Ni_{0.5}Mn_{0.5})_yCo_x)_{1-k}A_k)_{1-}$ $_aO_2$, wherein A is a dopant, $-0.025 \leq a \leq 0.025$, $0.15 \leq x \leq 0.22$, $0.42 \leq z \leq 0.52$, $1.075 < z/y < 1.300$, $x+y+z=1$ and $k \leq 0.01$, and wherein the positive electrode active material has a crystallite size <41.5 nm as determined by the Sherrer equation based on the peak of the (104) plane obtained from the X-ray diffraction pattern using a Cu Kα radiation source. In an embodiment, $0.15 \leq x \leq 0.18$. In another embodiment, the lithium transition metal-based oxide powder has a carbon content ≤1000 ppm. It might also be that the lithium transition metal-based oxide powder has a sulfur content between 0.05 and 1.0 wt %. In a further embodiment the powder further comprises up to 1 wt % of a coating comprising either one or more of $Al_2O_3$, $WO_3$, $LiAlO_2$, $LiF$, $Li_3PO_4$, $Li_2ZrO_3$, $Li_2WO_4$, $MgO$ and $Li_2TiO_3$. Also, the powder may further comprise up to 1 wt % of a coating comprising a boron compound. This boron compound may be either one or more of $LiBO_2$, $Li_2B_4O_7$, $B_2O_3$ and $Li_3BO_3$. In the general formula, the dopant A may be either one or more of Al, Ca, W, B, Si, Ti, Mg and Zr. In a particular embodiment, a dopant A is Zr, and the powder further comprises up to 1 wt % of a coating comprising a boron compound and $WO_3$.

This invention discloses high Ni-excess NMC materials which have an optimized composition in a narrow range, resulting in enhanced battery performances, such as excellent high capacity, long cycle stability, and thermal stability. These cathode materials can be produced by a competitive process.

BRIEF DESCRIPTION OF THE FIGURES

FIG. 4b. Exploded view of FIG. 5a

DETAILED DESCRIPTION

Figure 1:
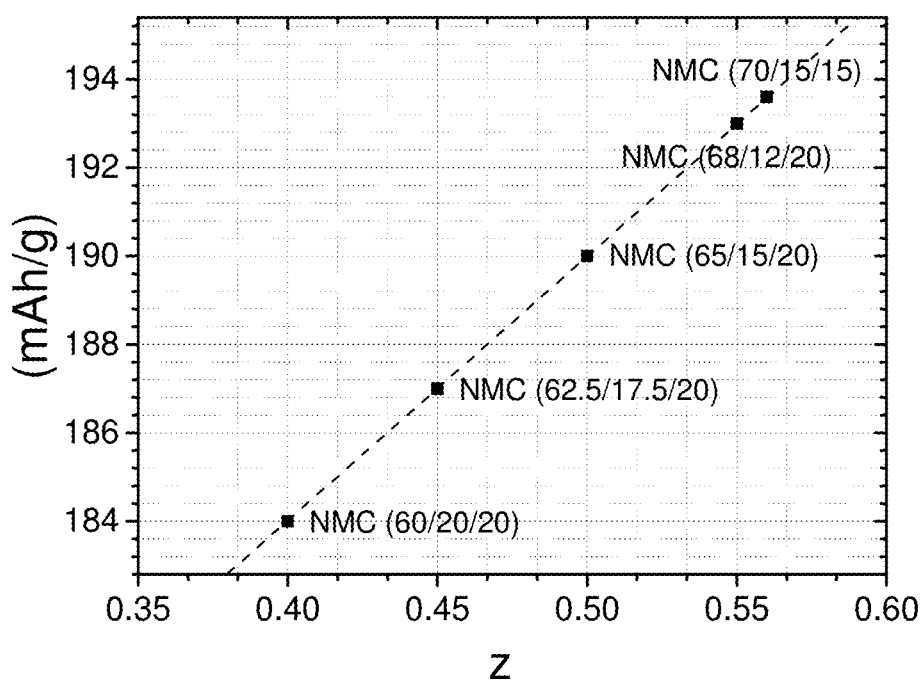
FIG. 1. Calculated reversible capacity of NMC materials as function of Ni-excess FIG. 2. Contour plot of initial discharge capacities of NMC compounds in coin cell testing method 1

The invention focuses on lithium transition metal oxides used as active materials in a positive electrode in rechargeable lithium batteries. By active material is meant a material that has the capability of reversibly incorporating Li-ions in its crystal structure during charging and discharging of a battery. The cathode materials have the NMC composition which is $LiM'O_2$ with M' being one or more transition metals selected from Ni, Mn, and Co; but M' may also be doped with other elements. The cathode materials of the invention have a specific range of compositions which allows to achieve an optimum performance Particularly, a high reversible capacity is achieved together with good cycle stability and safety. The improved performance is obtained if the Co content is ranging from 0.15 to 0.22 and Ni and Mn vary within a small range. This Ni—Mn range can be expressed by 2 relations which are related to each other: Ni—Mn and Ni/Mn. The molar ratio of Ni/Mn, expressed by 1+2*z/y, can also affect the performance such as capacity and cycle stability, as described in "Ionics, 20, 1361-1366 (2014)". With the increase of the ratio of Ni/Mn, the total discharge capacity increases, but when the ratio becomes too high, the stability of the electrode material decreases. When on the other hand the Mn content increases versus the Ni content, the capacity decreases. As the Ni content increases both the Ni excess "z" (=Ni minus Mn) as well as the Ni to Mn stoichiometric ratio increases. An improved performance is obtained if the Ni-excess ranges from 0.42 to 0.52 and if the Ni to Mn stoichiometric ratio is ranging from 3.15 to 3.60.

When W and/or Zr based dopants are added, the material exhibits a higher discharge capacity and improved rate capability. Doping sources such as $WO_3$ or $ZrO_2$ are added to the mixed transition metal precursor or to the lithium deficient intermediate before sintering if a multiple step sintering process is used, as is explained below.

Typically cathode materials disclosed in this invention are manufactured by a multiple sintering method using a mixed transition metal precursor like mixed metal hydroxide $M'(OH)_2$, oxyhydroxide M'OOH, or an intermediate $M'O_a(OH)_{2-a}$ (with M'=Ni, Mn, and Co; and 0<a<1).

In the following description the term "M'-hydroxide" encompasses these different precursor compositions. M'-hydroxide is typically prepared by a precipitation process. Feed(s) of a metal containing acid solution is fed into a stirred reactor. At the same time, feed(s) of base is added to the reactor. Furthermore, additives such as ammonia or oxalate are fed into the reactor to better control the particle growth. The metal acid that usually used is a transition metal sulfate solution and the typical base is NaOH. Thus, a precipitation reaction "$M'SO_4+2NaOH \rightarrow M'(OH)_2+Na_2SO_4$" takes place. Many precipitation device designs are possible. A continuously stirred tank reactor (CSTR) process provides a continuous process which both supplies the feed solution and collects the overflow continuously.

Alternatively, the design can be a batch-process where the precipitation is stopped after the reactor is filled. It can also be the combination of batch and thickening processes where more precipitate accumulates in the reactor, because liquid (after sedimentation or filtering) is removed, but the majority of solid remains in the reactor during the process. In this way, the feed of $M'SO_4$ and NaOH into the reactor can continue for a longer time.

During the precipitation reaction conditions like RPM of the stirrer, pH of the tank, flow rates and flow rate ratios, residence time and temperature etc. are kept well controlled to obtain a high quality mixed transition metal hydroxide product. After precipitation the obtained mixed transition metal hydroxide is filtered, washed and dried. Thus, the mixed transition metal hydroxide is achieved. The mixed transition precursor will be the precursor for the sintering process that follows.

As the mixed transition metal precursors may be prepared by a precipitation method, the target transition metal composition M' in the precipitated M'-hydroxide has a Co content of 0.15 to 0.22 mol and it contains a Ni-excess (=Ni−Mn) of 0.42 to 0.52. Furthermore the Ni to Mn ratio is between 3.15 to 3.60. The transition metal composition can thus be written as $Ni_z(Ni_{0.5}Mn_{0.5})_yCo_x$ where $0.42 \leq z \leq 0.52$, $0.15 \leq x \leq 0.22$ and $3.15 < (2*z/y)+1 < 3.60$.

The cathode materials of the invention can be prepared by a cost efficient sintering process. The sintering is performed in an oxygen containing gas. Contrary to cathode materials with very high Ni-excess cathode materials which require to be prepared in a $CO_2$ free atmosphere like pure $O_2$, the cathode materials of the current invention can be sintered in air, which allows to decrease the cost of the preparation process. Typically, the cathode materials are prepared by a multiple sintering approach, although a single sintering process is also possible. If a double sintering is applied, the $1^{st}$ sintering process may deliver a product having a Li/M' stoichiometric ratio which is less than 1. And the $2^{nd}$ sintering process delivers the fully lithiated product which has a Li/M' stoichiometric ratio near to unity. Such a process is disclosed in WO2017-042654.

In the $1^{st}$ sintering step, the mixed transition metal precursor is blended with a lithium source. Typically $LiOH.H_2O$ or $Li_2CO_3$ is used as a lithium source. The use of $Li_2CO_3$ is possible and allows to reduce preparation cost, with the exception that $Li_2CO_3$ cannot be used if the Ni-excess is too high. The blend is sintered in oxygen containing gas (for example, in a flow of air) to obtain a lithium deficient intermediate material. A typical sintering temperature is higher than 650° C. but less than 950° C. The intermediate material may have a Li/M' stoichiometric ratio less than unity, typically ranging from 0.7 to 0.95.

In the $2^{nd}$ sintering process, the target ratio is near to the stoichiometric Li/M'=1.00 value. A lithium deficient intermediate from the $1^{st}$ sintering step is therefore mixed with $LiOH.H_2O$ in order to obtain the final Li/M' target composition. The blend is sintered in oxygen containing gas (for example, in a flow of air or oxygen) to obtain the final cathode material. A typical sintering temperature is equal to or higher than 750° C., preferably higher than 800° C. but less than 850° C. The $2^{nd}$ sintering condition determines the primary particle size of the positive electrode material, and has a major influence on its properties. Typically, post processing steps (milling, sieving, etc.) follow after sintering. Instead of applying a 2 step sintering process, cathode materials can be also prepared by other suitable processes. The conventional single step sintering is a possible alternative. If single sintering is applied a typical Li source is $LiOH.H_2O$.

The resulting cathode material has a good crystal structure and it has a low soluble base content. Especially, the content of soluble carbonate base is low. Typical values for carbon content (being present as soluble carbonate) range from 150 ppm to about 1000 ppm, but preferably not exceeding 400 ppm. If the carbon content is too high, less capacity is obtained and the cycle stability deteriorates. Additionally bulging properties deteriorate. Bulging is an unwanted property where battery volumes increase due to gas evolution within the batteries when charged pouch cells are exposed to heat. Finally, the cathode may contain sulfur. At least 0.05%, preferably at least 0.1% of sulfur by mass may be present. The presence of sulfur improves the cycle stability and increase reversible capacity. Our results indicate that sulfur is important to optimize grain boundaries in polycrystalline cathode materials. If the sulfur content is much less then grain boundaries are very tight and the reversible capacity deteriorates. The content of sulfur should not exceed 1% by mass otherwise reversible capacity is lost.

After the $2^{nd}$ sintering process, the obtained active material can be used as cathode material in rechargeable lithium ion batteries. The performance of cathodes with this particular composition can be further enhanced by surface treatments, thereby allowing to increase the charging voltage without deteriorating performance, and thus allow to achieve a higher energy density. The surface treatment stabilizes the surface against undesirable reactions that happen in batteries during cycling or storage, and might also be efficient to prevent the cracking of particles during extended cycling because this would trigger new surface—enhancing undesired side reactions. The change of Li content in the cathode during charge-discharge causes volume changes which create strain. Surface coatings may contribute to reduce the strain on the surface and crack-nucleation is delayed. The mechanism is well described in 'Journal of The Electrochemical Society, 164, A6116-A6122 (2017)'. In a typical surface treatment approach, all the surfaces or parts of the surfaces are covered by suitable chemicals. Currently, Al and Zr based compounds are popular, however many chemicals can be used for surface treatment, some of them are listed in 'Nature Communications, 7, 13779 (2016)'. The application of the chemical is done by wet or dry processing. Usually, the amount of chemicals for surface treatment is low, being in the range of 1% by mass or less. In this invention surface coating methods have been used that apply Al and/or LiF, or $LiNaSO_4$ to the surface. These methods have been described in U.S. Pat. No. 6,753,111, WO2016-116862, and EP3111494 A1. Other surface treatment methods are known which apply Mg, W, B, P, etc.-containing chemicals.

W and/or B based surface coatings provide an enhanced cycle stability due to a reduced soluble base content. In this invention, W or $WO_3$ based coatings and/or B, $LiBO_2$, $Li_2B_4O_7$, $B_2O_3$ or $Li_3BO_3$ based coatings may be obtained by heat treating a mixture of a positive electrode active material and a coating source.

If the Ni-excess is larger than 0.52, a surface treatment is less efficient to improve performance.

If the Ni-excess is less than 0.42, then surface treatment improves the performance, but the capacity becomes insufficient. The combination of a surface treatment and proper Ni-excess is synergetic. Generally, after applying the chemicals to the surface a heat treatment follows.

Typical heat treatment temperatures are (a) 100-250° C.: if the process is a classical coating process involving melting or drying;

(b) 300-450° C.: if surface reactions are desired but the bulk should not react and (c) 600-800° C.: if certain solid state diffusion or bulk reactions are involved.

Examples of this invention may apply (1) an Al based coating followed by a heat treatment in the temperature range of (c); or (2) an Al and LiF based coating or an Al and $LiNaSO_4$ based coating using the temperature range of (b).

The present invention observes that only a narrow compositional range allows to obtain high capacity and at the same time a good cycle stability and safety. If the composition deviates from this optimum region then deterioration of cycle stability is observed. Within the optimum region, a sufficient high capacity can be achieved by applying a relatively high charge voltage. The cathode material within this narrow optimized region is particularly suitable to be used in large batteries or in batteries which apply a charge voltage exceeding 4.15V. It typically shows a good performance at 4.3 V or even at 4.35 V and at high temperature. Also, cathode materials with optimized compositions show much better safety properties and cycle stability compared to very high Ni-excess NMC such as NMC 811 or NC 91.

If the composition deviates even slightly from the values given above, the performance worsens. If the Ni-excess is lower, the capacity at fixed voltage decreases as well, and a higher charge voltage needs to be applied to achieve the target capacity. As this voltage is too high, a poor cycle stability is observed. If the Co content is higher, the cost of the cathode increases and the capacity at fixed voltage decreases. If the Co content is lower, structural instability during cycling is observed. The structural instability manifests itself by a worse cycle stability compared to reference. It is surprising that such instability—which is more typical for very high Ni-excess cathodes—is observed for medium high Ni-excess cathodes with less Co content. The authors conclude that accurate Co concentration control is critical in the cathode materials to achieve a good performance. If the Ni-excess is higher, the preparation difficulties increase. Also, the capacity obtained from fixed voltage is lower than expected, and when charged at higher voltage to obtain the targeted capacity, a lower performance is obtained. Particularly, the safety deteriorates and the cycle stability is lower compared to the target composition.

The lithium to metal ratio of the cathode material is near to unity: $Li_{1+a}M'_{1-a}O_2$ with "a" being near to zero. If the lithium concentration is higher, then the soluble base content increases and the capacity deteriorates. If the lithium concentration is less the capacity deteriorates. The authors conclude that the control of the lithium to transition metal stoichiometric ratio within about the 0.95-1.05 range is critical to obtain to achieve a good performance.

The crystallite size of the positive electrode material can be controlled by the (final) sintering temperatures. In this invention, it is observed that a crystallite size less than 41.5 nm achieves an enhanced electrochemical performance, especially a good cycle stability. If the crystallite size is too large, the amount of Li vacancies increases, resulting in a structural instability and a degraded discharge capacity. In addition, a large crystallite size may lead to a low BET, low porosity and low pressed density, resulting in a deteriorated battery performance On the other hand, if the crystallite size is too small—for example below 25 nm—a sufficiently sintered positive electrode material is not achieved, the material having a worse battery performance because of its high soluble base and high BET.

The conclusion is the following: if the composition is different from the optimum composition, the overall performance worsens. Particularly:

if the Co is larger than 0.22 the capacity deteriorates
if the Co is less than 0.15 the cycle stability deteriorates
if the Ni-excess is less than 0.42 the capacity is insufficient
if the Ni-excess is larger than 0.52 the cycle stability and safety properties deteriorate
if the ratio of Ni/Mn (=(z+(0.5*y))/0.5*y) is larger than 3.60, the cycle stability deteriorates,
if the ratio of Ni/Mn is less than 3.15, the capacity deteriorates,
if the Li/M' stoichiometric ratio largely exceeds 1.05 the capacity deteriorates and the content of soluble base becomes too high, and
if the Li/M' stoichiometric ratio is much less than 0.95 the capacity and cycle stability deteriorate.
If the crystallite size is >41.5nm the cycle stability deteriorates.

Description of Analysis Methods

A) Coin Cell Testing a) Coin Cell Preparation

For the preparation of a positive electrode, a slurry that contains electrochemical active material, conductor (Super P, Timcal), binder (KF#9305, Kureha)—with a formulation of 90:5:5 by weight—in a solvent (NMP, Mitsubishi) is prepared by a high speed homogenizer. The homogenized slurry is spread on one side of an aluminum foil using a doctor blade coater with 230 μm gap. The slurry coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between a positive electrode and a piece of lithium foil used as a negative electrode. 1M $LiPF_6$ in EC/DMC (1:2) is used as electrolyte and is dropped between separator and electrodes. Then, the coin cell is completely sealed to prevent leakage of electrolyte.

b) Testing Method 1

Method 1 is a conventional "constant cut-off voltage" test. The conventional coin cell test in the present invention follows the procedure shown in Table 1. Each cell is cycled at 25° C. using a Toscat-3100 computer-controlled galvanostatic cycling station (from Toyo). The coin cell testing procedure uses a 1C current definition of 160mA/g and comprises two parts as follows:

Part I is the evaluation of rate performance at 0.1C, 0.2C, 0.5C, 1C, 2C, and 3C in the 4.3-3.0V/Li metal window range. With the exception of the $1^{st}$ cycle where the initial charge capacity (CQ1) and discharge capacity (DQ1) are measured in constant current mode (CC), all subsequent cycles feature a constant current-constant voltage during the charge with an end current criterion of 0.05C. A rest time of 30 minutes for the first cycle and 10 minutes for all subsequent cycles is allowed between each charge and discharge.

Part II is the evaluation of cycle life at 1C. The charge cut-off voltage is set as 4.5V/Li metal. The discharge capacity at 4.5V/Li metal is measured at 0.1C at cycles 7 and 34 and 1C at cycles 8 and 35.

Part III is an accelerated cycle life experiment using 1C rate for the charge and 1C rate for the discharge between 4.5 and 3.0V/Li metal. Capacity fading is calculated as follows:

$$1C/1C\ QFad. = \left(1 - \frac{DQ60}{DQ36}\right) \times \frac{10000}{24}\ \text{in}\ \frac{\%}{100}\ \text{cycles}$$

TABLE 1

Coin cell testing method 1 procedure

| | | Charge | | | | Discharge | | | |
|---|---|---|---|---|---|---|---|---|---|
| Type | Cycle No | C Rate | End current | Rest (min) | V/Li metal (V) | C Rate | End current | Rest (min) | V/Li metal (V) |
| Part I | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |

TABLE 1-continued

Coin cell testing method 1 procedure

| | | Charge | | | | Discharge | | | |
|---|---|---|---|---|---|---|---|---|---|
| Type | Cycle No | C Rate | End current | Rest (min) | V/Li metal (V) | C Rate | End current | Rest (min) | V/Li metal (V) |
| Part II | 7 | 0.25 | 0.1 C | 10 | 4.5 | 0.10 | — | 10 | 3.0 |
| | 8 | 0.25 | 0.1 C | 10 | 4.5 | 1.00 | — | 10 | 3.0 |
| | 9~33 | 0.50 | 0.1 C | 10 | 4.5 | 1.00 | — | 10 | 3.0 |
| | 34 | 0.25 | 0.1 C | 10 | 4.5 | 0.10 | — | 10 | 3.0 |
| | 35 | 0.25 | 0.1 C | 10 | 4.5 | 1.00 | — | 10 | 3.0 |
| Part III | 36~60 | 1.00 | — | 10 | 4.5 | 1.00 | — | 10 | 3.0 | c) Testing Method 2

It is not easy to compare cycling stability of different cathode materials if their specific capacities are different. If one sample has a low capacity and cycles well, and the other has a high capacity and cycles worse, it is not easy to make a "fair" comparison. Therefore, "Testing Method 2" uses a constant charge capacity protocol. Testing method 2 compares the cycle stability at the same capacity. A fixed charge capacity of 200 mAh/g is chosen. In general, during cycling "fade" is observed since reversible capacity is lost. Thus, in order to keep the charge capacity fixed at 200 mAh/g, the charging voltage increases continuously. Monitoring the end-of-charge voltage is a sensitive tool to quantify the fade rate during cycling under fixed charge voltage conditions. The faster the voltage increases the worse is the cycle stability. A maximum voltage of 4.7V is defined. Testing at higher voltages makes little sense as the electrolyte stability deteriorates dramatically at high voltage. Therefore, if the charge voltage exceeds 4.7V, the testing switches to constant voltage (V=4.7V) testing type. The switch-over cycle from constant Q to constant V is easily detected when plotting the capacities as a function of cycle number. It is a good reference to characterize the cycle stability: the later the switch-over happens the better is the cycle stability.

Finally, during "normal" (constant V) testing, the full capacity is not always achieved as of the first cycle. Sometimes the capacity increases during the first few cycles. This effect is called "negative fade" or "activation". In order to minimize such effects—before applying the fixed charge capacity of 200 mAh/g, 10 cycles at low voltage are performed. A low voltage which is a "soft" testing condition is chosen because it allows to avoid capacity losses caused by structural damage during activation. Thus, it is intended that the capacity fading happens during the following "harsh" cycles using the fixed charge capacity of 200 mAh/g. Table 2 shows the detailed testing protocol. The coin cell testing procedure uses a 1C current definition of 220 mA/g and comprise two parts as follows:

Part I (activation) is the evaluation of cycle life from the $1^{st}$ to the $10^{th}$ cycle at 0.5C in the 4.1-3.0V/Li metal window range. Cycles feature a constant current-constant voltage during the charge with an end current criterion of 0.05C. A rest time of 20 minutes for all cycles is allowed between each charge and discharge.

Part II (constant Q cycling) is the evaluation of cycle life under the fixed charge capacity (Q). For the 1st cycle in this part, the charge and discharge capacity is measured at 0.2C in the 4.3-3.0V/Li metal window range. During the next 9 cycles, a test is performed to achieve the fixed charge capacity. The charging time is limited to the moment when 200 mAh/g of charge capacity is obtained. In order to acquire the fixed capacity, the end-of-charge voltage increases. And when the charge voltage exceeds 4.7V, the testing switches to constant voltage (V=4.7V) testing type. This procedure is repeated four times. Finally, one cycle is further measured at 0.2C.

The cycle stability is measured by a slope (S) calculated as follows:

$$S = \frac{(4.7\,V - \text{End of charge voltage at 14 cycles})}{N\,(\text{cycle})} \times \frac{1000\,(mV)}{1\,(V)}$$

where N is the number of cycles (after cycle 14) until reaching 4.7V or N is 37 when the voltage of 4.7V is not reached at cycle 51. The lower the slope S the more stable cycling material is observed.

TABLE 2

Coin cell testing method 2 procedure

| | | Charge | | | | | Discharge | | | |
|---|---|---|---|---|---|---|---|---|---|---|
| Type | Cycle No | C Rate | End Current | Rest (min) | Time limit | V/Li metal (V) | C Rate | End Current | Rest (min) | V/Li metal (V) |
| Part I | 1~10 | 0.5 C | 0.05 C | 20 | | 4.1 | 0.5 C | — | 20 | 3.0 |
| Part II | 11 | 0.2 C | | 20 | | 4.3 | 0.2 C | — | 20 | 3.0 |
| | 12~20 | 0.5 C | | 20 | Q | 4.7 | 0.5 C | — | 20 | 3.0 |
| | 21 | 0.2 C | | 20 | | 4.3 | 0.2 C | — | 20 | 3.0 |
| | 22~30 | 0.5 C | | 20 | Q | 4.7 | 0.5 C | — | 20 | 3.0 |
| | 31 | 0.2 C | | 20 | | 4.3 | 0.2 C | — | 20 | 3.0 |
| | 32~40 | 0.5 C | | 20 | Q | 4.7 | 0.5 C | — | 20 | 3.0 |
| | 41 | 0.2 C | | 20 | | 4.3 | 0.2 C | — | 20 | 3.0 |
| | 42~50 | 0.5 C | | 20 | Q | 4.7 | 0.5 C | — | 20 | 3.0 |
| | 51 | 0.2 C | | 20 | | 4.3 | 0.2 C | — | 20 | 3.0 |

*Q = 200 mAh/g d) Testing Method 3

"Testing method 3" is a test of storage properties. In this test the capacity is measured before and after storage at high temperature. Coin cells are prepared as described above. The capacity is measured at 0.1C in the 4.3-3.0V/Li metal window range. Table 3 summarizes the details of the applied testing procedure.

TABLE 3

Storage properties testing procedure before storage

| | Charge | | | | Discharge | | | |
|---|---|---|---|---|---|---|---|---|
| Cycle No | C Rate | End Current | Rest (min) | Time limit | V/Li metal (V) | C Rate | End Current | Rest (min) | V/Li metal (V) |
| 1 | 0.1 C | 0.05 C | 20 | | 4.3 | 0.1 | — | 20 | 3.0 |
| 2 | 0.1 C | | | X | 4.8 | | | | |

*X = 190 mAh/g

The discharge capacity DQ1' at the $1^{st}$ cycle is used as a reference value to evaluate the storage properties. The $2^{nd}$ cycle charges to prepare for storage. After charging the coin cells until 190 mAh/g, the coin cells are disassembled. Because electrodes are "wet", excess electrolyte is removed by washing with DMC and the electrodes are sealed in Al pouch bags. These pouch bags are stored at 80° C. for 2 weeks. After storage, new coin cells are assembled with these electrodes and fresh electrolyte. After inserting in the battery cycler machine, a post-mortem cycling schedule is applied and the remaining capacity is measured. Table 4 summarizes the details of the applied post-mortem testing procedure. Here, the retained capacity (DQ2")=the discharge capacity at the $2^{nd}$ cycle is chosen to evaluate the storage properties. The properties are determined by the change of discharge capacities before and after the storage period. The recovered capacity (R.Q) is calculated as follows:

$$R.Q = \frac{DQ2''}{DQ1'} \times 100 \ (\%)$$

TABLE 4

Storage properties testing procedure after storage

| | Charge | | | | Discharge | | | |
|---|---|---|---|---|---|---|---|---|
| Cycle No | C Rate | End Current | Rest (min) | V/Li metal (V) | C Rate | End Current | Rest (min) | V/Li metal (V) |
| 1~3 | 0.1 C | 0.05 C | 10 | 4.3 | 0.1 | — | 10 | 3.0 |

B) X-Ray Diffraction Measurement

The X-ray diffraction pattern of the positive electrode material is collected with a Rigaku X-Ray Diffractometer (Ultima IV) using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 158 mm. For the XRD, diffraction patterns are obtained in the range of 15-85° (2θ) with a scan speed of 1° per min and a step-size of 0.02° per scan. The crystallite sizes are calculated from the diffraction angle and the full width at half maximum (FWHM) of the peak of the (104) plane obtained from the X-ray diffraction pattern using the known Scherrer equation:

$$\tau = \frac{K\lambda}{\beta \cos\theta}$$

τ: Crystallite size (nm), being the mean size of the ordered (crystalline) domains, which may be smaller or equal to the grain size K: Scherrer constant, 0.9

λ: X-ray wavelength (CuKα=1.5418 Å)

β: FWHM

θ: XRD peak position, one half of 2θ

The peak of the (104) plane assigned to a crystal structure with space group R-3m is observed at (around) 44.5±1° in an X-ray diffraction pattern.

C) Carbon Analysis

The carbon content of the cathode materials is measured by a Horiba EMIA-320V Carbon/Sulfur analyzer. 1 g of cathode materials is placed in a ceramic crucible in a high frequency induction furnace. 1.5 g of tungsten and 0.3 g of tin as accelerators are added into the crucible. The materials is heated at a programmable temperature. Gases produced during the combustion are then analyzed by four infrared detectors. The analysis of $CO_2$ and CO contents determines the carbon concentration.

D) Inductively Coupled Plasma (ICP) Analysis

The composition of NMC products in this description is measured by the inductively coupled plasma (ICP) method using an Agilent ICP 720-ES. 1 g of powder sample is dissolved into 50 mL high purity hydrochloric acid in an Erlenmeyer flask. The flask is covered by a watch glass and heated on a hot plate at 380° C. until complete dissolution of the precursor. After being cooled to room temperature, the solution and the rinsing water of Erlenmeyer flask are transferred to a 250 mL volumetric flask. Afterwards, the volumetric flask is filled with DI water up to the 250 mL mark, followed by complete homogenization. An appropriate amount of solution is taken out by pipette and transferred into a 250 mL volumetric flask for the $2^{nd}$ dilution, where the volumetric flask is filled with internal standard and 10% hydrochloric acid up to the 250 mL mark and then homogenized. Finally, this solution is used for ICP measurement.

E) Differential Scanning Calorimetry (DSC) Analysis

Coin cell electrodes are prepared as described above. Small electrodes, containing about 3.3 mg of active material are punched and assembled in coin cells. The cells are charged to 4.3V using a C/24 rate followed by a constant voltage soak for at least 1 hour. After disassembly of the coin cells, electrodes are repeatedly washed with dimethyl carbonate (DMC) to remove the remaining electrolyte. After evaporation of DMC, the electrodes are immersed into stainless steel cans and about 1.3 mg of electrolyte is added, followed by hermetic closing (crimping) of the cells. The electrolyte is the same as used for the coin cell preparation described above. The DSC measurement is performed using a TA instrument DSC Q10 device. The DSC scan is conducted from 50 to 350° C. using a heat rate of 5° C./min DSC cells and crimping equipment were also supplied by TA. The exothermic heat capacity is estimated by integrating the peak area above a baseline between 100 and 320° C.

F) Full Cell Testing 650 mAh pouch-type cells are prepared as follows: the cathode material, Super-P (Super-P™ Li commercially available from Timcal), graphite (KS-6 commercially available from Timcal) as positive electrode conductive agents and polyvinylidene fluoride (PVDF 1710 commercially available from Kureha) as a positive electrode binder are added to N-methyl-2-pyrrolidone (NMP) as a dispersion medium so that the mass ratio of the positive electrode active material powder, the positive electrode conductive agents super P and graphite, and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15pm thick aluminum foil. The width of the applied area is 43 mm and the length is 450 mm. Typical cathode active material loading weight is 13.9 mg/cm$^2$. The electrode is then dried and calendared using a pressure of 100 Kgf (981 N).

Typical electrode density is 3.2 g/cm$^3$. In addition, an aluminum plate serving as a positive electrode current collector tab is arc-welded to an end portion of the positive electrode.

Commercially available negative electrodes are used. In short, a mixture of graphite, carboxy-methyl-cellulose-sodium (CMC) and styrenebutadiene-rubber (SBR), in a mass ratio of 96/2/2, is applied on both sides of a copper foil. A nickel plate serving as a negative electrode current collector tab is arc-welded to an end portion of the negative electrode. Typical cathode and anode discharge capacity ratio used for cell balancing is 0.75. Non-aqueous electrolyte is obtained by dissolving lithium hexafluorophosphate (LiPF$_6$) salt at a concentration of 1.0 mol/L in a mixed solvent of ethylene carbonate (EC) and diethyl carbonate (DEC)) in a volume ratio of 1:2.

A sheet of the positive electrode, a sheet of the negative electrode, and a sheet of separator made of a 20 μm-thick microporous polymer film (Celgard® 2320 commercially available from Celgard) interposed between them are spirally wound using a winding core rod in order to obtain a spirally-wound electrode assembly. The assembly and the electrolyte are then put in an aluminum laminated pouch in an air-dry room with dew point of -50° C., so that a flat pouch-type lithium secondary battery is prepared. The design capacity of the secondary battery is 650 mAh when charged to 4.20V.

The non-aqueous electrolyte solution is impregnated for 8 hours at room temperature. The battery is pre-charged at 15% of its theoretical capacity and aged for a day at room temperature. The battery is then degas sed and the aluminum pouch is sealed. The battery is prepared for use as follows: the battery is charged using a current of 0.2C (with 1C=650 mA) in CC mode (constant current) up to 4.2V then CV mode (constant voltage) until a cut-off current of C/20 is reached, before being discharged in CC mode at 0.5C rate down to a cut-off voltage of 2.7V.

The prepared full cell battery is charged and discharged several times under the following conditions at 45° C., to determine their charge-discharge cycle performance:

charge is performed in CC mode under 1C rate up to 4.2V, then CV mode until C/20 is reached, the cell is then set to rest for 10 minutes, discharge is done in CC mode at 1C rate down to 2.7V, the cell is then set to rest for 10 minutes, the charge-discharge cycles proceed until the battery reaches around 80% retained capacity.

Every 100 cycles, one discharge is done at 0.2C rate in CC mode down to 2.7 V.

The number of cycles at 80% of recovered capacity (# of cycles at 80% of R.Q.) is obtained to count the number of cycles when the discharge capacity in the cycle reaches 80% of the initial discharge capacity. If the discharge capacity doesn't reach 80% of the initial discharge capacity within 1000 cycles, the # of cycle at 80% of R.Q. is extrapolated using the last 50 cycles assuming that the discharge capacity continues to decrease linearly.

G) SEM and EDS Analysis a) SEM Analysis

The morphology of the positive electrode material and of its cross-section are analyzed by a Scanning Electron Microscopy (SEM) technique. The measurement is performed with a JEOL JSM 7100F scanning electron microscope equipment under a high vacuum environment of $9.6 \times 10^{-5}$ Pa at 25° C. The images of samples are recorded with magnifications of 2000 to 10000 times.

b) Cross-Section Preparation

The cross-section of the positive electrode material is prepared by an ion beam cross-section polisher (CP) instrument, which is a JEOL (IB-0920CP). The instrument uses argon gas as beam source. A small amount of the positive electrode material powder is mixed with a resin and hardener, then the mixture is heated for 10 minutes on a hot plate. After heating, it is placed into the ion beam instrument for cutting, and the settings are adjusted in a standard procedure, with a voltage of 6.5 kV for a 3 hours duration. The cross-section of the positive electrode material is analyzed by "SEM analysis".

c) EDS Analysis

Using the sample prepared in "Cross-section preparation", the distribution of an element from the surface part to the center part of positive electrode material particles is analyzed by SEM and energy-dispersive X-ray spectroscopy (EDS). The SEM/EDS is performed on a JEOL JSM 7100F SEM equipment with a 50 mm$^2$ X-Max$^N$ EDS sensor from Oxford instruments. An EDS analysis of positive electrode material particles provides the quantitative element analysis of the cross-section. In the cross-section EDS, it is assumed that particles are spherical. An imaginary straight line is set from the surface point to the opposite surface point of a particle, where the line passes the center point of the particle. The 1$^{st}$ surface point is set as 'D1', the center point is set as 'D3' and the 2$^{nd}$ surface point is set as 'D5'. The additional two points, which are 'D2' and 'D4', between the center (D3) and the surfaces (D1 and D5). The 5 points are investigated by an EDS analysis with a scanning time of 1 min. The EDS analysis of the surface points D1 and D5 are taken as close to the surface as is experimentally feasible (i.e. at approx. 0.5 μm distance from the surface), since a measurements at the very edge of the particle would result in a false contribution by exterior influences. The EDS results in examples give the average of the values obtained from a selection of five particles.

Manufacturing Example 1

The following description gives an example of the manufacturing procedure of high Ni-excess NMC powders through a double sintering process which is a solid state reaction between a lithium source, usually Li$_2$CO$_3$ or LiOH.H$_2$O, and a mixed transition metal source, usually a mixed transition metal hydroxide M'(OH)$_2$ or oxyhydroxide M'OOH (with M'=Ni, Mn and Co), but not limited to these hydroxides, as discussed before. The double sintering process includes amongst others two sintering steps:

1) 1$^{st}$ blending: to obtain a lithium deficient sintered precursor, the lithium and the mixed transition metal sources are homogenously blended in a Henschel Mixer® for 30 mins.

2) $1^{st}$ sintering: the blend from the $1^{st}$ blending step is sintered at 700 to 950° C. for 5-30 hours under an oxygen containing atmosphere in a furnace. After the $1^{st}$ sintering, the sintered cake is crushed, classified and sieved so as to ready it for the $2^{nd}$ blending step. The product obtained from this step is a lithium deficient sintered precursor, meaning that the Li/M' stoichiometric ratio in LiM'O$_2$ is less than 1.

3) $2^{nd}$ blending: the lithium deficient sintered precursor is blended with LiOH.H$_2$O in order to correct the Li stoichiometry. The blending is performed in a Henschel Mixer® for 30 mins.

4) $2^{nd}$ sintering: the blend from the $2^{nd}$ blending is sintered in the range of 800 to <850° C. for 5-30 hours under an oxygen containing atmosphere in a furnace.

5) Post treatment: after the $2^{nd}$ sintering, the sintered cake is crushed, classified and sieved so as to obtain a non-agglomerated NMC powder.

Manufacturing Example 2

The following description gives an example of the manufacturing procedure of high Ni-excess NMC powders through a direct sintering process which is a solid state reaction between a lithium source, usually Li$_2$CO$_3$ or LiOH.H$_2$O, and a mixed transition metal source, usually a mixed transition metal hydroxide M'(OH)$_2$ or oxyhydroxide M'OOH (with M'=Ni, Mn and Co), but not limited to these hydroxides, as discussed before. The direct sintering process includes steps:

1) Blending: the lithium and the mixed transition metal sources are homogenously blended with the optimized Li stoichiometry in a Henschel Mixer® for 30 mins.

2) Sintering: the blend from the blending step is sintered at 700 to <850° C. for 5-30 hours under an oxygen containing atmosphere in a furnace.

3) Post treatment: after the sintering, the sintered cake is crushed, classified and sieved so as to obtain a non-agglomerated NMC powder.

Manufacturing Example 3

The following description gives an example of the manufacturing procedure of high Ni-excess NMC powders through a split sintering process which is a solid state reaction between a lithium source, usually Li$_2$CO$_3$ or LiOH.H$_2$O, and a mixed transition metal source, usually a mixed transition metal hydroxide M'(OH)$_2$ or oxyhydroxide M'OOH (with M'=Ni, Mn and Co), but not limited to these hydroxides, as discussed before. The split sintering process includes two successive sintering steps:

1) Blending: the lithium and the mixed transition metal sources are homogenously blended with the optimized Li stoichiometry in a Henschel Mixer® for 30 mins.

2) $1^{st}$ Sintering: the blend from the blending step is sintered at 700 to <850° C. for 5-30 hours under an oxygen containing atmosphere in a furnace.

3) $2^{nd}$ Sintering: the sintered powder is again sintered in the range of 800 to <860° C. for 5-30 hours under an oxygen containing atmosphere in a furnace.

4) Post treatment: after the $2^{nd}$ sintering, the sintered cake is crushed, classified and sieved so as to obtain a non-agglomerated NMC powder.

Example 1

Sample EX1.1 is prepared according to the above-mentioned "Manufacturing Example 1". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia. In the 1' blending step, 5.5 kg of the mixture of M'(OH)$_2$, wherein M'=N0.625Mn$_{0.175}$Co$_{0.20}$ (Ni-excess=0.45), and LiOH.H$_2$O with Li/M' ratio of 0.85 is prepared. The $1^{st}$ blend is sintered at 800° C. for 10 hours under an oxygen atmosphere in a chamber furnace. The resultant lithium deficient sintered precursor is blended with LiOH.H$_2$O in order to prepare 50 g of the $2^{nd}$ blend of which Li/M' is 1.01. The $2^{nd}$ blend is sintered at 840° C. for 10 hours under the dry air atmosphere in a chamber furnace. The above prepared EX1.1 has the formula Li$_{1.005}$M'$_{0.995}$O$_2$ (Li/M'=1.01).

EX1.2, which has the formula Li$_{0.975}$M'$_{1.025}$O$_2$ (Li/M'=0.95), is prepared according to the same method as in EX1.1 except that the $1^{st}$ and $2^{nd}$ sintering temperatures are 720° C. and 845° C., respectively.

EX1.3, which has the formula Li$_{1.015}$M'$_{0.985}$O$_2$ (Li/M'=1.03), is prepared according to the same method as in EX1.1 except that the $2^{nd}$ sintering temperature is 835° C.

EX1.4, which has the formula Li$_{1.024}$M'$_{0.976}$O$_2$ (Li/M'=1.05), is prepared according to the same method as in EX1.1 except that the $2^{nd}$ sintering temperature is 835° C.

EX1.5 is prepared according to the same method as in EX1.1 except that the $1^{st}$ and $2^{nd}$ sintering temperatures are 720° C. and 760° C.

To evaluate the example as a positive electrode for lithium ion batteries, coin cells are prepared by the above-mentioned "Coin cell preparation". The conventional coin cell test of the example is performed by the above-mentioned "Testing Method 1". Initial discharge capacity (DQ1) is measured at 0.1C in the 4.3-3.0V/Li metal window range. Capacity fading (1C/1C QFad.) is measured at 1C for charge and discharge in the 4.5-3.0V/Li metal. To investigate the cycle stability of the example at fixed state of charge, a coin cell is evaluated by the above-mentioned "Testing Method 2" and the fixed charge capacity of 200 mAh/g are used. The slope (S), which means the cycle stability, is evaluated using the end-of-charge voltage as function of cycle number until the switch-over point. The storage property of the example at 80° C. for 2 weeks is estimated by the above-mentioned "Testing Method 3". The recovered capacity (R.Q), which indicates the storage property, is evaluated by observing the capacity change before (DQ1') and after storage (DQ2").

As mentioned in the "X-ray diffraction measurement", the crystallite size of the samples are calculated by Scherrer equation using the peak of (104) plane at (around) 44.5±1° in an X-ray diffraction pattern.

The carbon content of the samples is measured by the above-mentioned "Carbon Analysis". Carbon concentration is determined by detecting the produced gases (CO$_2$ and CO) during the combustion of a sample at 50-350° C. The sulfur content of the samples is measured by the above-mentioned "ICP analysis". The thermal stability of the example is investigated by the above-mentioned "DSC Analysis". The exothermic heat capacity is estimated by integrating the peak area above a baseline between 100 and 320° C. in the DSC result.

The initial discharge capacity, capacity fading, slope, recovered capacity, crystallite size, carbon content, sulfur content and exothermic heat capacity of EX1.1 to EX1.5 are shown in Table 5.

Comparative Example 1

Sample CEX1.1, which has the formula Li$_{1.034}$M'$_{0.966}$O$_2$ (Li/M'=1.07), is prepared according to the same method as in EX1.1 except that the $1^{st}$ and $2^{nd}$ sintering temperatures are 720° C. and 830° C., respectively.

Sample CEX1.2 is prepared according to the same method as in EX1.1 except that the $2^{nd}$ sintering temperature is 850° C.

Comparative Example 2

Sample CEX2 with a composition $Li_{1.005}M'_{0.995}O_2$ (Li/M'=1.01) is obtained according to the same method as in EX1.1, except that M' in M'(OH)$_2$ is $Ni_{0.65}Mn_{0.10}Co_{0.25}$ (Ni-excess=0.55) and the $2^{nd}$ sintering temperature is 800° C.

Comparative Example 3

CEX3 with a composition $Li_{1.005}M'_{0.995}O_2$ (Li/M'=1.01) is prepared according to the same method as in EX1.1, except that M' in M'(OH)$_2$ is $Ni_{0.65}Mn_{0.175}Co_{0.175}$ (Ni-excess=0.48) and the $2^{nd}$ sintering temperature is 825° C.

Comparative Example 4

CEX4 with a composition $Li_{1.005}M'_{0.995}O_2$ (Li/M'=1.01) is obtained according to the same method as in EX1.1, except that M' in M'(OH)$_2$ is $N_{0.6}Mn_{0.2}Co_{0.2}$ (Ni-excess=0.4) and the $2^{nd}$ sintering temperature is 860° C.

Comparative Example 5

CEX5 with a composition LiM'O$_2$ (Li/M'=1.00) is obtained according to the same method as in EX1.1, except that M' in M'(OH)$_2$ used as precursor is $N_{0.68}Mn_{0.12}Co_{0.2}$ (Ni-excess=0.56) and the $2^{nd}$ sintering temperature is 820° C.

Comparative Example 6

CEX6 with formula $L_{0.995}M'_{1.005}O_2$ (Li/M'=0.99) is obtained according to the same method as in EX1.1, except that M' in M'(OH)$_2$ is $N_{0.7}Mn_{0.15}Co_{0.15}$ (Ni-excess=0.55) and the $2^{nd}$ sintering temperature is 830° C.

The initial discharge capacities and capacity fading of comparative examples CEX1 to 6 are measured according to the same method as in EX1. So too are the slope of the example, which means the cycle stability, the storage property at 80° C. for 2 weeks, the carbon content and the sulfur content. The initial discharge capacity, capacity fading, slope, recovered capacity, crystallite size, carbon content and sulfur content are shown in Table 5.

Example 2

EX2.1, which is an industrial scale product, is prepared according to the above-mentioned "Manufacturing Example 1". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia. In the $1^{st}$ blending step, 5.5 kg of the mixture of M'(OH)$_2$, wherein M'=Ni0.625Mn0.175Co0.20 (Ni-excess=0.45), and Li$_2$CO$_3$ with Li/M' ratio of 0.8 is prepared. The $1^{st}$ blend is sintered at 885° C. for 10 hours under the dry air atmosphere in a chamber furnace. The resultant lithium deficient sintered precursor is blended with LiOH.H$_2$O in order to prepare 4.5 kg of the $2^{nd}$ blend of which Li/M' is 1.045. The $2^{nd}$ blend is sintered at 840° C. for 10 hours in a dry air atmosphere in a chamber furnace. The above prepared EX2.1 has the formula $Li_{1.022}M'_{0.978}O_2$ (Li/M'=1.045).

EX2.2, which is an aluminum coated lithium transition metal oxide, is prepared by the following procedure. 1.3 kg of EX2.1 is blended with 0.26 g of aluminum oxide. The blend is heated at 750° C. for 7 hours in a chamber furnace. The heated aluminum coated lithium transition metal oxide is sieved with a 270 mesh (ASTM) sieve.

EX2.3, which is an aluminum coated lithium transition metal oxide containing LiNaSO$_4$ as a secondary phase, is prepared by the following procedure. 4.0 kg of EX2.1 is blended with 8.0 g of aluminum oxide to prepare the $1^{st}$ blend. The $1^{st}$ blend is blended with a Na$_2$S$_2$O$_8$ solution (48 g Na$_2$S$_2$O$_8$ powder in 140 ml water) by a high RPM blender to prepare the $2^{nd}$ blend. The $2^{nd}$ blend is heated at 375° C. for 6 hours. The heated aluminum coated lithium transition metal oxide containing LiNaSO$_4$ as a secondary phase is sieved using a 270 mesh (ASTM) sieve.

The initial capacities, capacity fading, crystallite size and carbon content of EX2.1, EX2.2 and EX2.3 are measured according to the same method as in EX1 and are shown in Table 5. Full cell testing of EX2.1, EX2.2 and EX2.3 are performed following the above mentioned full cell testing method, yielding a number of cycles at 80% of recovered capacity that is given in Table 5.

Comparative Example 7

CEX7.1, which is an industrial scale product, is prepared according to the above-mentioned "Manufacturing Example 1". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia. In the $1^{st}$ blending step, 5.5 kg of the mixture of M'(OH)$_2$, wherein M'=$N_{0.6}Mn_{0.2}Co_{0.2}$ (Ni-excess=0.40), and Li$_2$CO$_3$ with a Li/M' ratio of 0.85 is prepared. The $1^{st}$ blend is sintered at 900° C. for 10 hours under a dry air atmosphere in a chamber furnace. The resultant lithium deficient sintered precursor is blended with LiOH.H$_2$O in order to prepare 3.0 kg of the $2^{nd}$ blend with a Li/M' ratio of 1.055. The $2^{nd}$ blend is sintered at 855° C. for 10 hours under a dry air atmosphere in a chamber furnace. The above prepared CEX7.1 has the formula $Li_{1.027}M'_{0.973}O_2$ (Li/M'=1.055).

CEX7.2, which is an aluminum coated lithium transition metal oxide, is prepared by the following procedure. 1.3 kg of EX7.1 is blended with 0.26 g of aluminum oxide. The blend is heated at 750° C. for 5 hours in a chamber furnace. The heated aluminum coated lithium transition metal oxide is sieved with a 270 mesh (ASTM) sieve.

Comparative Example 8

CEX8, which is an industrial scale product, is prepared according to the above-mentioned "Manufacturing Example 1". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia. In the $1^{st}$ blending step, 5.5 kg of the mixture of M'(OH)$_2$, wherein M'=$N_{0.70}Mn_{0.15}Co_{0.15}$ (Ni-excess=0.55), and LiOH.H$_2$O with Li/M' ratio of 0.85 is prepared. The $1^{st}$ blend is sintered at 800° C. for 10 hours under an oxygen atmosphere in a RHK (roller hearth kiln). The resulting lithium deficient sintered precursor is blended with LiOH.H$_2$O in order to prepare 3.0 kg of a 2$^{nd}$ blend with a Li/M' ratio of 0.99. The 2$^{nd}$ blend is sintered at 830° C. for 10 hours under an oxygen atmosphere in a chamber furnace. The above prepared CEX8 has the formula Li0.995M'$_{1.005}$O$_2$ (Li/M'=0.99).

Initial capacities, capacity fading, crystallite size, and carbon content of CEX7.1, CEX7.2 and CEX8 are measured according to the same method as in EX1 and are shown in Table 5. Full cell testing of CEX7.1, CEX7.2 and CEX8 are performed following the abovementioned full cell testing method, yielding a number of cycles at 80% of recovered capacity that is given in Table 5 and in FIG. 8.

Example 3

Sample EX3.1 is prepared according to the above-mentioned "Manufacturing Example 2". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia.

In the blending step, 5 kg of the mixture of M'(OH)$_2$, wherein M'=Ni$_{0.65}$Mn$_{0.20}$Co$_{0.15}$ (Ni-excess=0.45), and LiOH.H$_2$O with Li/M' ratio of 1.03 is prepared. At the same time, ZrO$_2$ is added to the mixture for preparation of the Zr doped lithium transition metal oxide.

The mixture is sintered at 823° C. for 10 hours under an oxygen atmosphere in a chamber furnace. The above prepared EX3.1 has the formula Li$_{1.015}$M'$_{0.985}$O$_2$ (Li/M'=1.03, M'=Ni$_{0.648}$Mn$_{0.199}$Co$_{0.150}$Zr$_{0.003}$).

EX3.2, which is a B and W coated lithium transition metal oxide, is prepared by the following procedure. 3 kg of EX3.1 is blended with 8.58 g of boric acid and 17.02 g of tungsten oxide. The blend is heated at 375° C. for 8 hours under an oxygen atmosphere in a chamber furnace. The heated B and W coated lithium transition metal oxide is sieved with a 270 mesh (ASTM) sieve.

To investigate the distribution of W in the positive electrode material particle, the cross-section of EX3.2 is analyzed as described in "SEM and EDS analysis". The distribution of Zr, W and B in the surface part of the positive active material are also analyzed as described in "ICP analysis" using the washed and dried positive active material powder. For a detailed surface characteristic, the XRD pattern obtained from "XRD measurement" is investigated.

EX3.3, which is an aluminum coated lithium transition metal oxide containing LiNaSO$_4$ as a secondary phase is prepared by the following procedure. First, lithium transition metal oxide is obtained according to the same method as in EX3.1, except that ZrO$_2$ is not added to the mixture and the sintering temperature is 835° C. In addition, the sintered lithium transition metal is mixed with aluminum oxide and a Na$_2$S$_2$O$_8$ solution by the same method as in EX2.3. The mixture is heated at 375° C. for 6 hours. The heated aluminum coated lithium transition metal oxide containing LiNaSO$_4$ as a secondary phase is sieved using a 270 mesh (ASTM) sieve.

Comparative Example

CEX9 is obtained according to the same method as in EX3.1, except that the sintering temperature is 850° C.

Initial discharge capacities, capacity fading, crystallite size, carbon content and sulfur content of EX3.1, EX3.2, EX3.3 and CEX9 are measured according to the same method as in EX1 and are shown in Table 5.

Example 4

EX4, which has the formula Li$_{1.024}$M'$_{0.976}$O$_2$ (Li/M'=1.05), is prepared according to the above-mentioned "Manufacturing Example 3". A mixed nickel-manganese-cobalt hydroxide (M'(OH)$_2$) is used as a precursor, where M'(OH)$_2$ is prepared by a co-precipitation process in a large-scale continuous stirred tank reactor (CSTR) with mixed nickel-manganese-cobalt sulfates, sodium hydroxide and ammonia.

In the blending step, 4 kg of the mixture of M'(OH)$_2$, wherein M'=Ni$_{0.65}$Mn$_{0.20}$Co$_{0.15}$ (Ni-excess=0.45), and LiOH.H$_2$O with Li/M' ratio of 1.05 is prepared. The mixture is sintered at 700° C. for 10 hours under an oxygen atmosphere in a chamber furnace. The sintered powder is sintered again at 850° C. for 10 hours.

Initial discharge capacities, capacity fading, crystallite size, carbon content and sulfur content of EX4 are measured according to the same method as in EX1 and are shown in Table 5.

TABLE 5

Properties of Examples

| Example ID | Li/M' | Ni-excess | Co/M' | Ni/Mn | XRD analysis Crystallite size (nm) | Testing Method 1 DQ1 (mAh/g) | Testing Method 1 QFad. (%/100) | Testing Method 2 Slope (mV) | Testing Method 3 R.Q (%) | Carbon Analysis Carbon (ppm) | DSC Analysis T (° C.) | DSC Analysis H.Q. (kJ/g) | Full cell testing # cycle at 80% of R.Q | ICP Analysis S (%) |
|---|---|---|---|---|---|---|---|---|---|---|---|---|---|---|
| EX1.1 | 1.010 | 0.45 | 0.200 | 3.57 | 37.6 | 182.5 | 17.9 | 7.6 | 83.1 | 364 | 261.4 | 2.108 | | 0.14 |
| EX1.2 | 0.950 | 0.45 | 0.200 | 3.57 | 37.0 | 179.6 | 20.2 | | | 185 | | | | |
| EX1.3 | 1.030 | 0.45 | 0.200 | 3.57 | 39.4 | 180.7 | 19.1 | 6.4 | | 378 | | | | |
| EX1.4 | 1.050 | 0.45 | 0.200 | 3.57 | 39.8 | 179.2 | 18.5 | 2.9 | | 444 | | | | |
| EX1.5 | 1.010 | 0.45 | 0.200 | 3.57 | 26.1 | 189.5 | 5.2 | | | 109 | | | | |
| CEX1.1 | 1.070 | 0.45 | 0.200 | 3.57 | 39.9 | 173.8 | 17.0 | | | 766 | | | | |
| CEX1.2 | 1.010 | 0.45 | 0.200 | 3.57 | 44.3 | 182.3 | 23.5 | | | 410 | | | | |
| CEX2 | 1.010 | 0.55 | 0.250 | 6.50 | 36.6 | 182.5 | 24.5 | 10.6 | 85.3 | 303 | | | | |
| CEX3 | 1.010 | 0.48 | 0.175 | 3.71 | 35.1 | 179.4 | 19.0 | 19.1 | 85.2 | 229 | | | | 0.08 |
| CEX4 | 1.010 | 0.40 | 0.200 | 3.00 | 37.7 | 176.9 | 18.9 | 17.2 | | | 265.9 | 2.018 | | 0.14 |
| CEX5 | 1.000 | 0.56 | 0.200 | 5.67 | 38.4 | 184.7 | 21.7 | 12.7 | 45.8 | | 250.6 | 2.240 | | 0.13 |
| CEX6 | 0.990 | 0.70 | 0.150 | 4.67 | 38.1 | 184.0 | 22.5 | 17.2 | 85.4 | | | | | 0.09 |
| EX2.1 | 1.045 | 0.45 | 0.200 | 3.57 | 36.6 | 179.6 | 19.0 | | | 334 | | | 915 | |

TABLE 5-continued

Properties of Examples

| Example ID | Li/M' | Ni-excess | Co/M' | Ni/Mn | XRD analysis Crystallite size (nm) | Testing Method 1 DQ1 (mAh/g) | Testing Method 1 1 C/1 C QFad. (%/100) | Testing Method 2 Slope (mV) | Testing Method 3 R.Q (%) | Carbon Analysis Carbon (ppm) | DSC Analysis T (° C.) | DSC Analysis H.Q. (kJ/g) | Full cell testing # cycle at 80% of R.Q | ICP Analysis S (%) |
|---|---|---|---|---|---|---|---|---|---|---|---|---|---|---|
| EX2.2 | 1.045 | 0.45 | 0.200 | 3.57 | 38.0 | 178.3 | 13.3 | | | 308 | | | 1271 | |
| EX2.3 | 1.045 | 0.45 | 0.200 | 3.57 | 37.0 | 182.1 | 11.4 | | | 195 | | | 1717 | |
| CEX7.1 | 1.055 | 0.40 | 0.200 | 3.00 | 42.7 | 175.1 | 21.6 | | | 598 | | | 577 | |
| CEX7.2 | 1.055 | 0.40 | 0.200 | 3.00 | 43.4 | 175.1 | 16.3 | | | | | | 928 | |
| CEX8 | 0.990 | 0.55 | 0.150 | 4.67 | 41.9 | 187.1 | 19.5 | | 302 | | | | 132 | |
| EX3.1 | 1.030 | 0.45 | 0.150 | 3.25 | 37.6 | 181.2 | 16.2 | | 558 | | | | | 0.13 |
| EX3.2 | 1.030 | 0.45 | 0.150 | 3.25 | 36.7 | 182.8 | 14.9 | | 391 | | | | | 0.13 |
| EX3.3 | 1.030 | 0.45 | 0.150 | 3.25 | 38.6 | 185.2 | 15.2 | | 95 | | | | | 0.40 |
| CEX9 | 1.030 | 0.45 | 0.150 | 3.25 | 44.6 | 183.0 | 22.5 | | 357 | | | | | 0.14 |
| EX4 | 1.050 | 0.45 | 0.150 | 3.25 | 41.2 | 181.7 | 18.7 | | 685 | | | | | 0.14 |

*H.Q.: exothermic heat capacity

As shown in Table 5, EX1.1 is compared with examples with higher and lower Co content. First, if the Co content is higher, such as for CEX2, the cycle stability decreases due to its lower Mn content. Conversely, if the Co content is lowered, such as for CEX3, but at the same time the Ni to Mn ratio becomes too high (z/y=1.35), the structural stability during cycling is deteriorated. Even though CEX3 has a high Ni-excess of 0.475, it has a lower discharge capacity and worse cycle stability to keep the fixed charge capacity.

Next, EX1.1 is compared to examples with low and high Ni-excess. If the Ni-excess is lower, such as CEX4, the capacity at a fixed voltage is lower. Additionally, to achieve the high charge capacity (200mAh/g), higher charge voltage is applied, resulting in poor cycle stability. Conversely, if the Ni-excess is higher, such as CEXS and CEX6, they have a higher discharge capacity. Accordingly, to obtain the high charge capacity, a lower charge voltage is applied. However, the safety still deteriorates and the cycle stability is lower compared to the EX1.1. In addition, a higher Ni-excess NMC compound (CEXS) exhibits poor thermal stability.

Furthermore, EX1.1 is compared with examples with higher and lower molar ratio of Ni/Mn. As shown in Table 5, if the ratio of Ni/Mn is too high, such as for CEX2, the discharge capacity is high but the cycle stability deteriorates. Conversely, if the ratio of Ni/Mn is too low, such as CEX4, the discharge capacity is low even at high voltage. Accordingly, NMC compounds, such as EX1.1, with a molar ratio Ni/Mn of 3.57, show higher capacity and better cycle stability.

Figure 2:
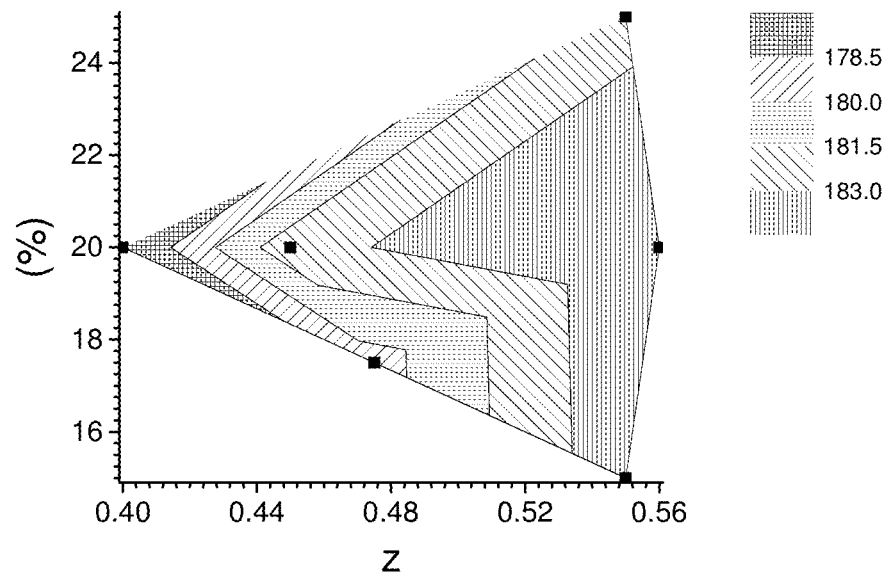

FIG. 2 shows the discharge capacities of the examples measured by "Testing Method 1". The values of DQ1 are indicated by the shading in the different regions using commercial software Origin 9.1-contour plot. In this figure, the x-axis is for the Ni-excess (z) and the y-axis is for the Co/M' (mol/mol %) in the NMC compounds. As the Ni-excess increases, the capacity also increases. The NMC compounds that have a discharge capacity above about 180 mAh/g correspond to compositions with high capacity. We observe an optimum of capacity at Co/M'=20 mol/mol %, higher capacities are achieved with less Ni-excess.

Figure 3:
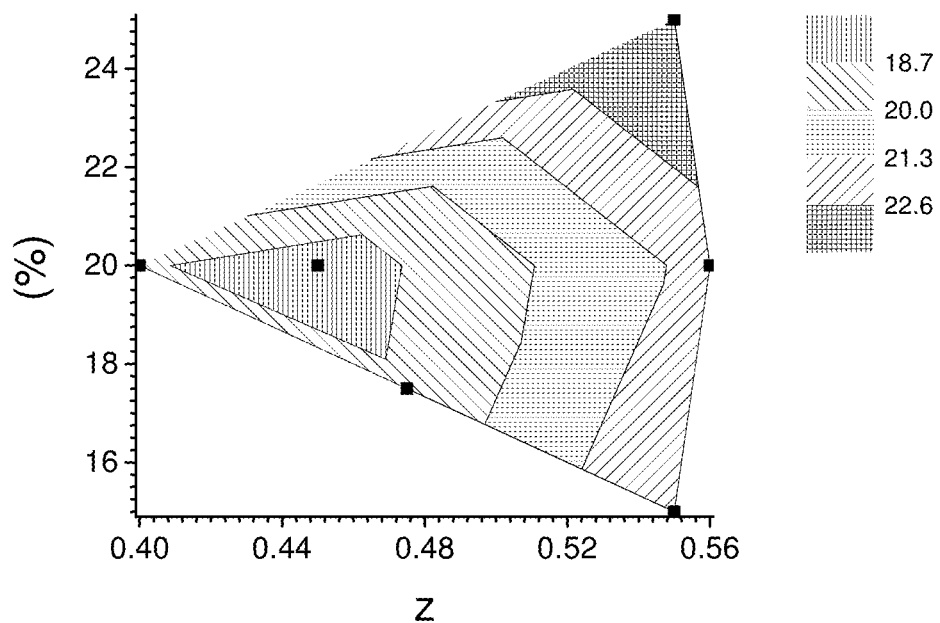
FIG. 3. Contour plot capacity fadings of NMC compounds in coin cell testing method 1

Next, FIG. 3 shows the capacity fade rate of the examples measured by "Testing Method 1". The values of 1C/1C QFad. in % per 100 cycles are indicated by the shading in the different regions using commercial software Origin 9.1-contour plot. In this figure, the x-axis is for Ni-excess (z) and the y-axis is for the Co/M' content (mol/mol %) in the sample. The samples that have a capacity fading below about 20 mol/mol % have a composition with improved cycle life. We observe a certain optimum of Co composition. With increasing Ni-excess, better cycle stabilities are observed at about 20 mol/mol % Co/M'.

Figure 4A:
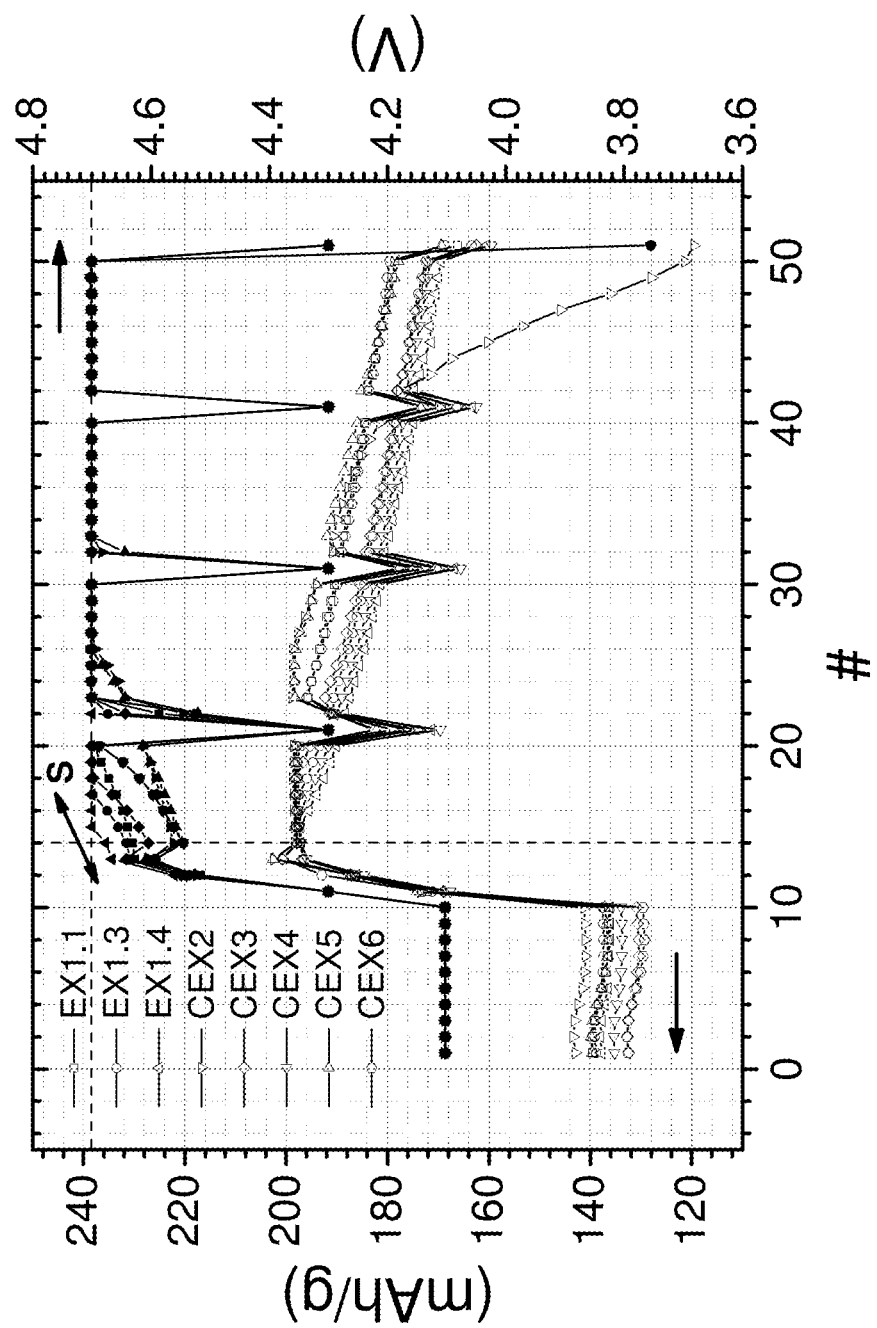
FIG. 4a. Slope results of NMC compounds in coin cell testing method 2
Figure 4B:
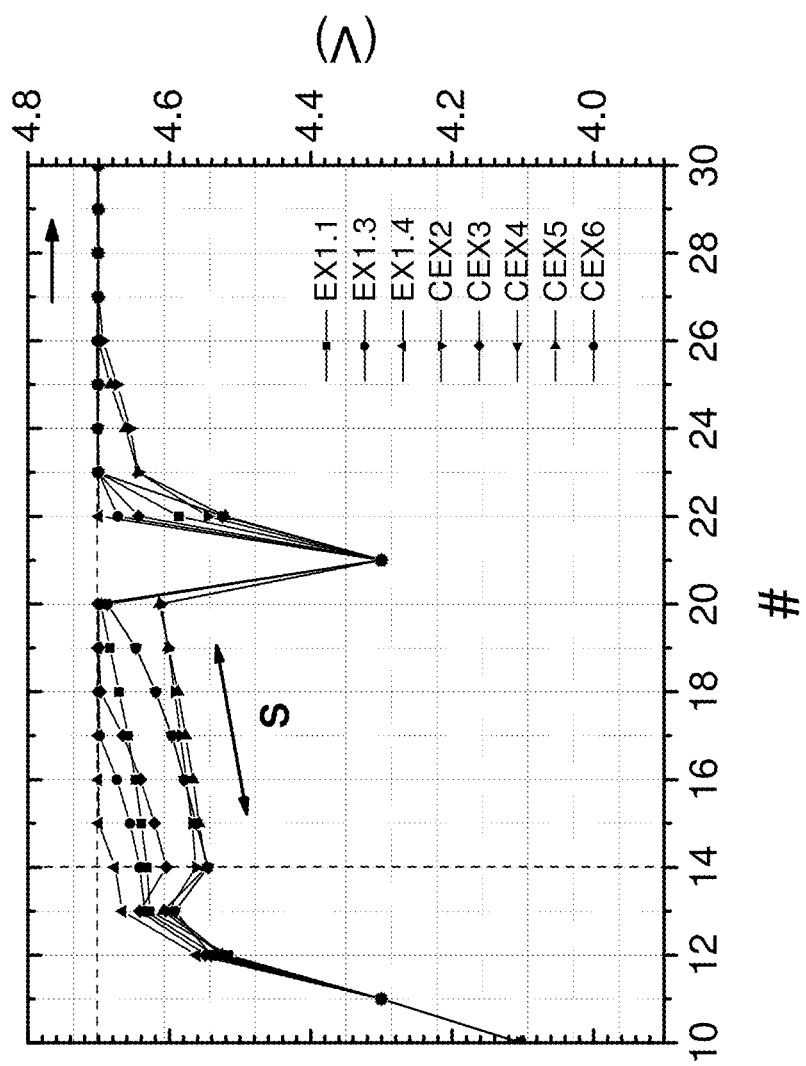

Moreover, FIGS. 4a, 4b (exploded view of upper left corner of FIGS. 4a) & 6 show the slope of the examples measured by "Testing Method 2". In FIGS. 4a & 4b, the x-axis gives the cycle number and the left and right y-axis are for discharge capacity and real cut-off charge voltage, respectively. In these figures, the values of slope (mV/cycle) are calculated according to the equation in "Testing Method 2". For example, EX1.1 has 4.6317V at cycle 14 and its number of cycles (N) is 23 until reaching 4.7V. The cycle stability of EX1.1 is measured by a slope (S) calculated as follows:

$$S = \frac{(4.7000 \text{ V} - 4.6317 \text{ V at 14 cycles})}{23 - 14 \text{ (cycle)}} \times \frac{1000 \text{ (mV)}}{1 \text{ (V)}} = 7.6 \text{ mV/cycle}$$

Furthermore, CEX3 has 4.6045V at cycle 14 and its number of cycles is 19 until reaching 4.7V. The slope of CEX3 is calculated as follows:

$$S = \frac{(4.7000 \text{ V} - 4.6045 \text{ at 14 cycles})}{19 - 14 \text{ (cycle)}} \times \frac{1000 \text{ (mV)}}{1 \text{ (V)}} = 19.1 \text{ mV/cycle}$$

Figure 5:
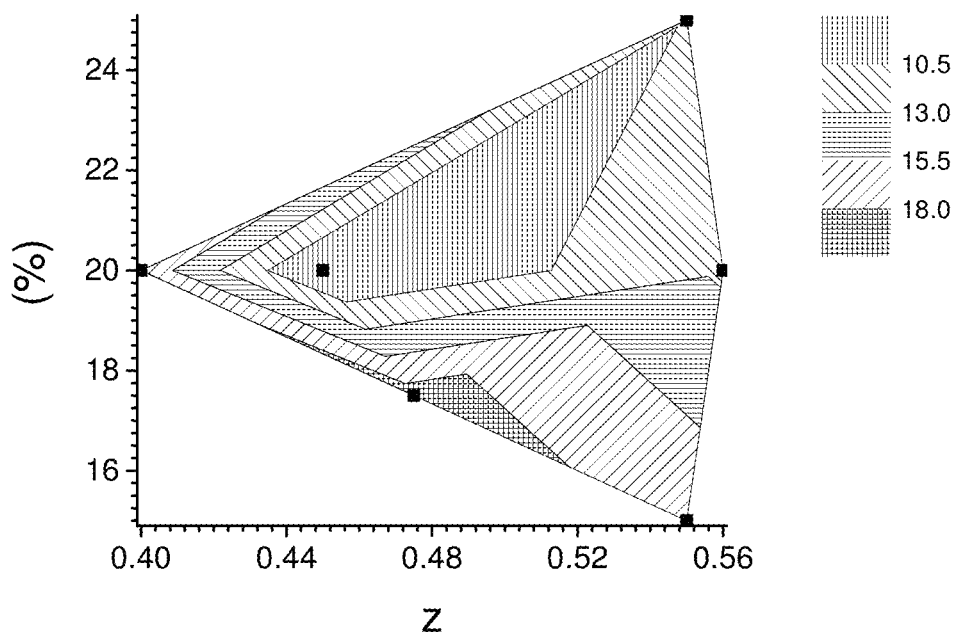
FIG. 5. Contour plot of slope results of NMC compounds in coin cell testing method 2

In FIG. 5, the values of slope (mV/cycle) are indicated by the shading in the different regions using commercial software Origin 9.1-contour plot. In this figure, the x-axis is for Ni-excess (z) and the y-axis is for the Co/M' content (mol/mol %) in the sample. As shown the figures, the samples that have a slope below about 16 mV have a composition with enhanced cycle stability. We observe that the slope gets worse as Ni-excess decreases, if the Ni-excess is below 0.42 and Co is below 0.15 or above 0.22 the slope is too large.

Figure 6:
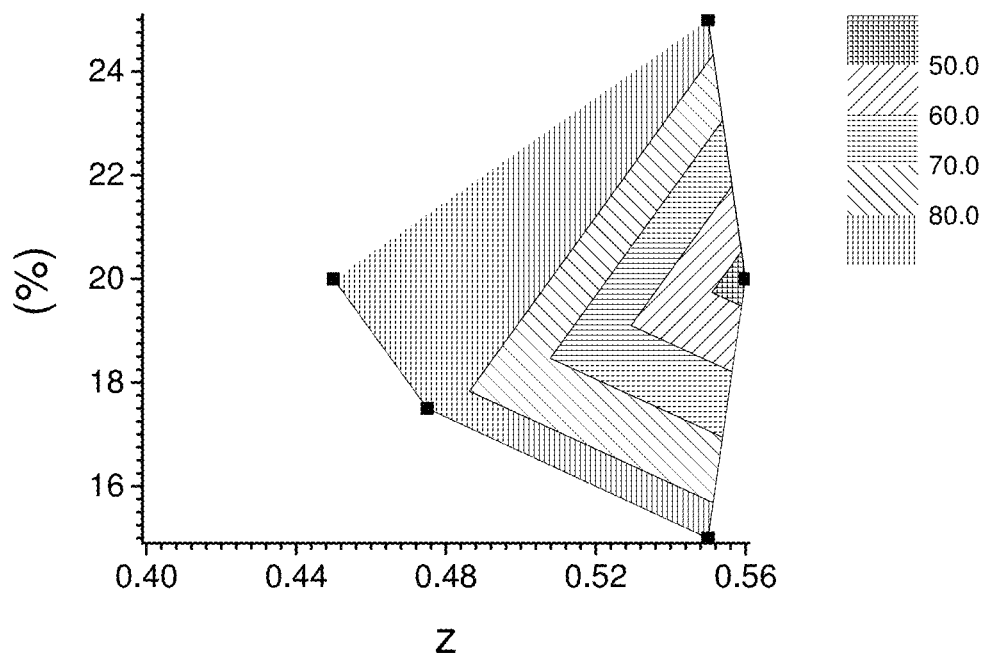
FIG. 6. Contour plot of recovered capacities of NMC compounds in coin cell testing method 3

Additionally, FIG. 6 shows the recovered capacity of the examples measured by "Testing Method 3". The values of R.Q. in % are indicated by the shading in the different regions using commercial Software Origin 9.1-contour plot. In this figure, the x-axis is for Ni-excess (z) and the y-axis is for the Co/M' content (mol/mol %). The samples that have a recovered capacity above about 70% have a composition having a good storage property at high temperature.

It can be concluded from FIGS. 2 to 6 that the best one of the optimized compositions is that of samples having a Co/M' content of 20 mol/mol % and z=0.45, as all the criteria described above are met by this composition.

Figure 7:
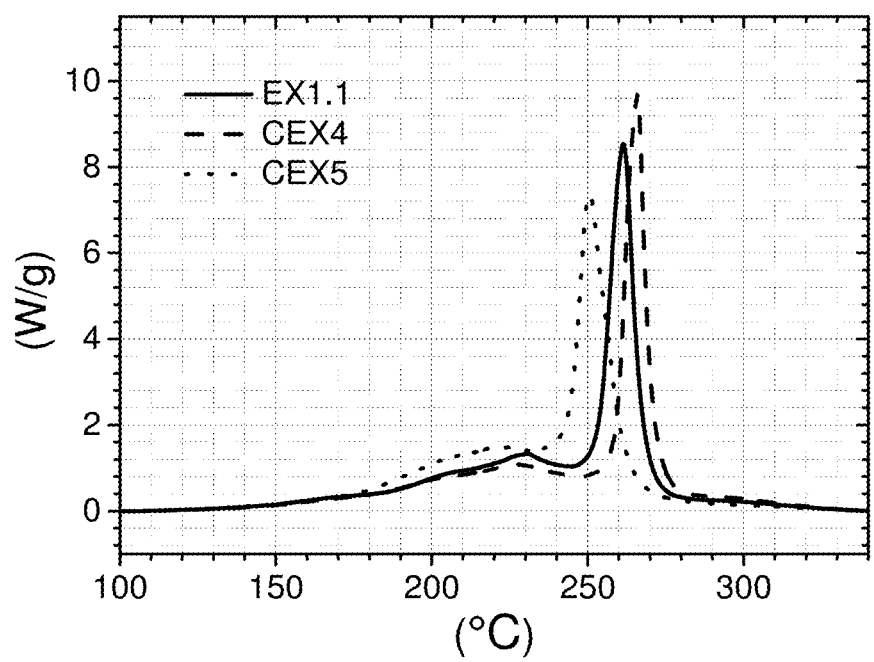
FIG. 7. DSC spectra of the NMC compounds

FIG. 7 shows the DSC spectra of EX1.1, CEX4 and CEX5. In this figure, the x-axis is for temperature (° C.) and the y-axis is for heat flow (W/g). The main exothermic peak, starting at about 180° C. and reaching a maximum at about 250° C. to 264° C., results from structural changes of the delithiated cathode, accompanied by oxygen release and subsequent combustion of the electrolyte by oxygen. Especially, as the Ni content in NMC increases, the temperature of the main peak continuously decreases and the evolved exothermic heat continuously increases, which indicates a worse safety. CEX5 with high Ni-excess (0.56) has a lower exothermic peak temperature and higher exothermic reaction enthalpy than the other examples. These examples show that as the Ni-excess increases the thermal stability of the charged cathode materials significantly deteriorates. Therefore, an increased capacity not only reduces the cycle stability but also reduces the safety. Accordingly, from these examples EX1.1 has an optimized composition with enhanced cell performances and high thermal stability.

To further identify the electrochemical properties of the samples of Example 1, NMC samples having various Li/M' ratio are investigated by "Testing method 1" and "Carbon Analysis". As described in Table 5, if the ratio of Li/M' is too high, such as CEX1.1, the reaction between the mixed transition metal source and the lithium source doesn't finish and results in unreacted and molten lithium sources. Therefore, the remaining lithium cause a large amount of carbon to exist in the final NMC product, and a low discharge capacity results.

On the other hand, if the ratio of Li/M' is too low, i.e. below 0.95, the lithium stoichiometry within the crystal structure is less than desired. XRD diffraction data (not shown here) allow to conclude that as a result of the low Li/M' more transition metals are located on lithium sites thus blocking the Li diffusion pathways. This causes a lower reversible capacity as well as poor cycle life. Therefore, the samples in EX1 with Li/M' of 0.95-1.05 have a specific composition with enhanced electrochemical performance, such as high capacity, good cycle stability and high thermal stability.

Additionally, if the crystallite size is greater than or equal to 41.5 nm, such as CEX1.2, the cycling stability deteriorates. Therefore, the samples having the crystallite size less than 41.5 nm have the good cycle life for long-term cycling. On the other hand, even if the crystallite size is small, such as EX1.5, a high discharge capacity and excellent reversibility can be obtained.

Figure 8:
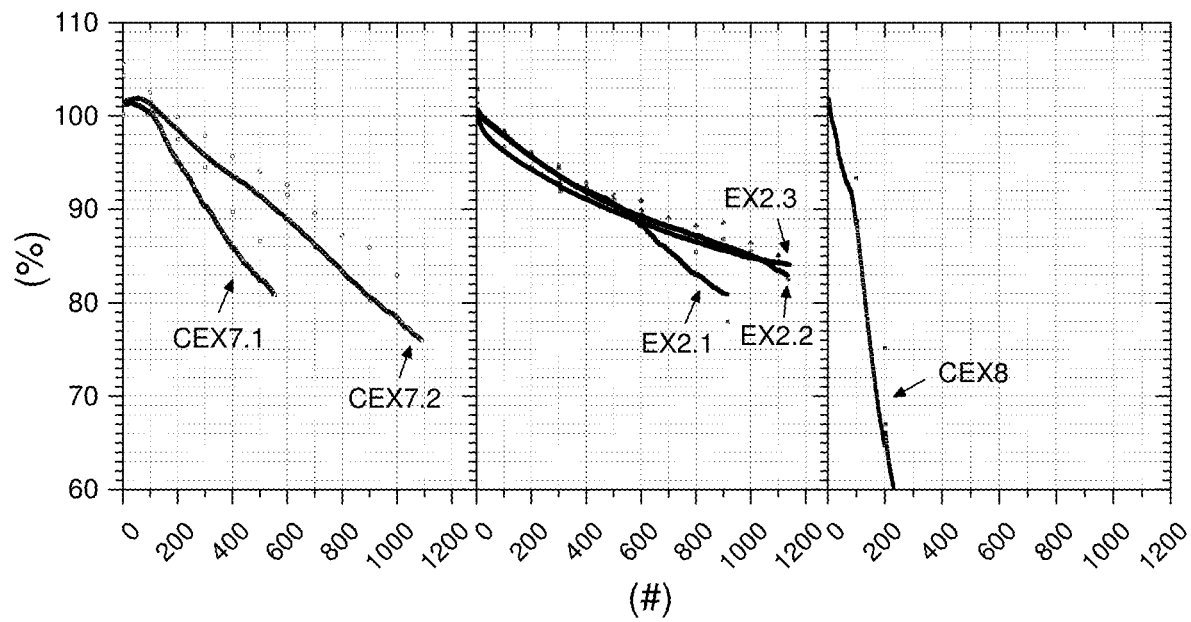
FIG. 8. Full cell cycle life test results, wherein x-axis is the number of cycles and y-axis is the relative discharge capacity.

EX2.1, CEX7.1, 7.2 and CEX8 were prepared at a scale using processes which are compatible with industrial production. The results of coin cell tests by the test method 1 and full cell tests (see FIG. 8) indicate that the above conclusion about the Ni-excess of around 0.45 being the best amongst the optimized NMC compositions is still valid in the industrial products. FIG. 8 and Table 5 further show that EX2.2 and EX2.3 have superior electrochemical properties, which indicates that the electrochemical performance can be further improved by surface modification technologies such as an aluminum coating.

Figure 9:
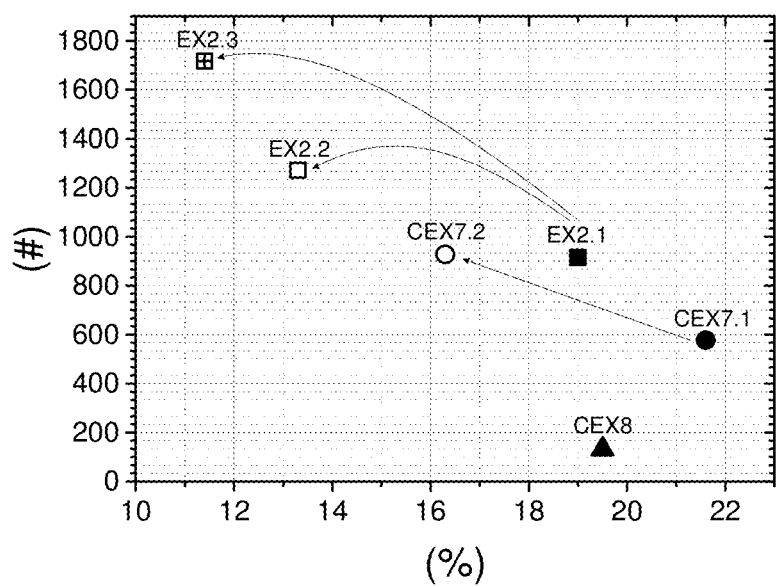
FIG. 9. Correlation between capacity fading from coin cell test method 1 and full cell cycle life.

FIG. 9 shows the correlation between capacity fading (1C/1C QFad.) from coin cell test method 1 and full cell cycle life. The x-axis is the capacity fading (1C/1C QFad.) in %/100 cycles from coin cell test method 1 and the y-axis is the number of cycles at 80% of the initial full-cell discharge capacity. It indicates that the results from coin cell test method 1 can represent the electrochemical properties of real batteries.

EX3.1 prepared by the direct sintering method has the formula $Li_{1.015}(Ni_{0.648}Mn_{0.199}Co_{0.150}Zr_{0.003})_{0.985}O_2$ and shows good electrochemical performance such as higher discharge capacity and improved cycle life. Additionally, with a B- and W-based coating, EX3.2 shows a high discharge capacity and good cycle stability.

Figure 10A:
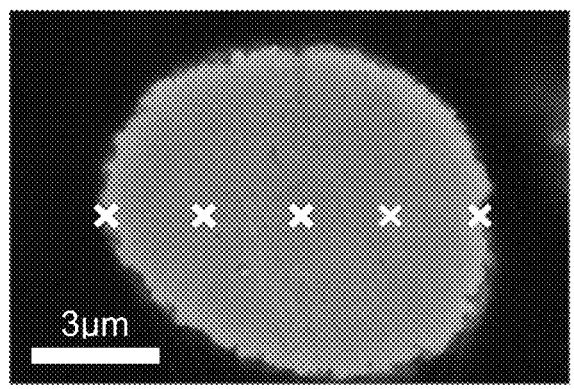
FIG. 10a. Cross-sectional SEM image of EX3.2, with selected positions (D1, D2, D3, D4 and D5) for EDS analysis.
Figure 10B:
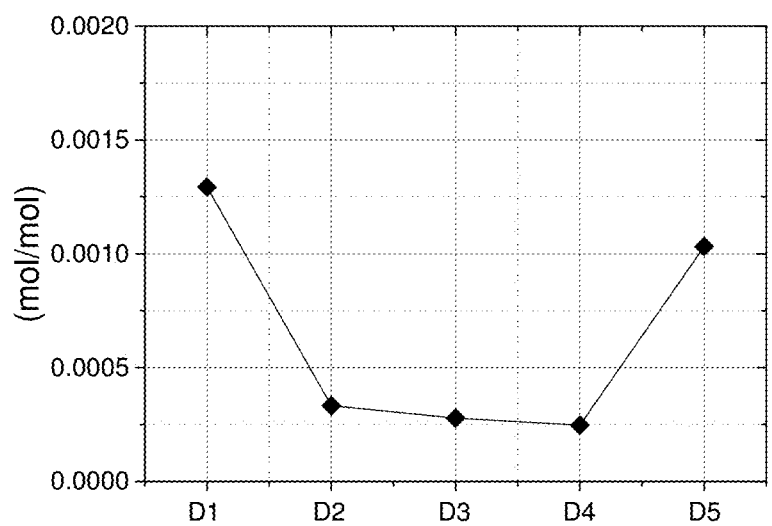
FIG. 10b. EDS profile of the W/M' molar ratio (mol/mol) of EX3.2 at selected positions.

To investigate the distribution of W, a cross section of EX3.2 is analyzed at the selected positions (D1, D2, D3, D4, and D5) by "EDS analysis" as shown in FIG. 10a. FIG. 10b shows the EDS analysis result of the selected positions (x axis-Dx position) for EX3.2, where the y axis indicates the W/M' molar ratio (mol/mol) (M'=Ni, Mn, and Co). The result shown is the average of values obtained from five electrode particles. As shown in FIG. 10b, W is predominantly present in the surface part of EX3.2.

The amounts of Zr, W and B in the surface part of EX3.2 are analyzed by "ICP analysis" using the washed and dried EX3.2. First, 5 g of EX3.2 is dispersed in 100 g of ultrapure water for 5 minutes at 25° C. using a magnetic stirrer and then, the dispersion is filtered. The filtered powder is dried at 80° C. for overnight. The dried powder is analyzed by "ICP analysis" and the analysis result is compared to that of EX3.2. (Herein, the dried powder is considered as the core part of EX3.2.) The amount of elements in the surface part of the positive electrode material is calculated by subtraction the amount of elements in the washed and dried EX3.2 (core) from the amounts of elements in EX3.2. The results of ICP analysis are indicated in Table 6.

TABLE 6

| ICP analysis of EX3.2 | | | |
| --- | --- | --- | --- |
| Example ID | Zr (%) | W (%) | B (%) |
| EX3.2 | 0.276 | 0.334 | 0.051 |
| EX3.2—Core | 0.282 | 0.109 | 0.001 |
| EX3.2—Surface | −0.006 | 0.225 | 0.050 |

As shown in Table 6, Zr is present in the core of the positive electrode material—the negative number for "EX3.2—Surface" is due to the error margin of the ICP analysis. On the other hand, W is partially present in the surface layer as a coating, and is also doped in the core of the positive electrode material. Finally, B exists only in the surface part of EX3.2.

Figure 11:
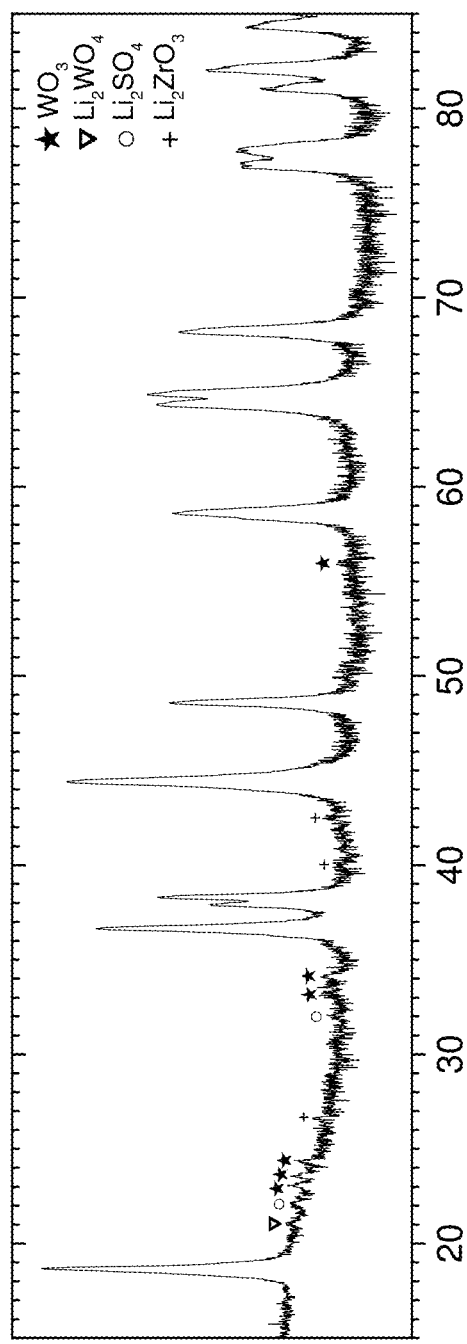
FIG. 11. XRD pattern of EX3.2.

As shown in FIG. 11, where the logarithmic y axis indicates the intensity and x axis indicates a diffraction angle (2θ), the XRD analysis shows that EX3.2 has some W present as a $WO_3$ phase in the surface or grain boundary or separate particles of the positive electrode material. Additionally, a $Li_2WO_4$ phase exists in the surface or grain boundaries of EX3.2. Small peaks related to $Li_2SO_4$ and $Li_2ZrO_3$ phases are also found in the obtained XRD pattern.

In conclusion, EX3.2 is a Zr doped NMC and—although not detected by ICP—having a $Li_2ZrO_3$ phase in the surface or grain boundary of the positive electrode material. W, which is partially doped in the positive electrode material, is present as $WO_3$ and $Li_2WO_4$ phases in the surface or grain boundary of separate particles. B exists only on the surface of the positive electrode material and could be washed away.

EX3.3, which is an Al coated and $Na_2S_2O_8$ containing positive electrode material, also exhibits an improved battery performance, especially discharge capacity. In contrast, CEX9 having the crystallite size above 41.5 nm exhibits a capacity fading.

EX4.1 prepared by the split sintering method has the formula $Li_{1.024}(Ni_{0.65}Mn_{0.20}Co_{0.15})_{0.976}O_2$ and also shows high discharge capacity and good cycle stability.

The invention claimed is:

1. A positive electrode material for lithium ion batteries, comprising a lithium transition metal-based oxide powder having a general formula $Li_{1+a}((Ni_z(Ni_{0.5}Mn_{0.5})_yCo_x)_{1-k}A_k)_{1-a}O_2$, wherein A is a dopant, $0 \leq a \leq 0.05$, $0.15 \leq x \leq 0.20$, $z \leq 0.45$, $1.125 < z/y < 1.285$, $x+y+z=1$ and $k \leq 0.01$, and wherein the positive electrode active material has a crystallite size 26.1 nm to less than 41.5 nm as determined by the Sherrer equation based on the peak of the (104) plane obtained from the X-ray diffraction pattern using a Cu Kα radiation source, and capacity fade rate of below 20 %/100 cycles as determined according to Testing Method 1.

2. The positive electrode material of claim 1, wherein $0.15 \leq x < 0.18$.

3. The positive electrode material of claim 1, wherein the powder further comprises up to 1 wt % of a coating comprising either one or more of $Al_2O_3$, $WO_3$, $LiA_1O_2$, $LiF$, $Li_3PO_4$, $Li_2ZrO_3$, $Li_2WO_4$, $MgO$ and $Li_2TiO_3$.

4. The positive electrode material of claim 1, wherein the powder further comprises up to 1 wt % of a coating comprising a boron compound.

5. The positive electrode material of claim 4, wherein the boron compound is either one or more of $LiBO_2$, $Li_2B_4O_7$, $B_2O_3$ and $Li_3BO_3$.

6. The positive electrode material of claim 1, wherein the dopant A is either one or more of Al, Ca, W, B, Si, Ti, Mg and Zr.

7. The positive electrode material of claim 1, wherein a dopant A is Zr, and wherein the powder further comprises up to 1 wt % of a coating comprising a boron compound and $WO_3$.

8. The positive electrode material of claim 1, wherein $0 \leq a \leq 0.025$.

9. The positive electrode material of claim 1, wherein the lithium transition metal-based oxide powder has a carbon content $\leq 1000$ ppm, wherein the carbon content in the positive electrode material is determined with an analysis of $CO_2$ and CO contents in a gas resulting from combustion of the positive electrode material.

10. The positive electrode material of claim 1, wherein the lithium transition metal-based oxide powder has a sulfur content between 0.05 and 1.0 wt %.

* * * * *